(12) United States Patent
Bhageria et al.

(10) Patent No.: US 10,915,130 B2
(45) Date of Patent: *Feb. 9, 2021

(54) MANAGING DEVICES WITHIN MICRO-GRIDS

(71) Applicant: INTERNATIONAL BUSINESS MACHINES CORPORATION, Armonk, NY (US)

(72) Inventors: Gopal Kumar Bhageria, Kolkata (IN); Kevin A. Klein, Houston, TX (US); Jean-Gael Fabien Reboul, Kenmore, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,046

(22) Filed: Feb. 28, 2019

(65) Prior Publication Data

US 2019/0235554 A1 Aug. 1, 2019

Related U.S. Application Data

(63) Continuation of application No. 15/288,238, filed on Oct. 7, 2016, now Pat. No. 10,268,224, which is a (Continued)

(51) Int. Cl.
*G06F 1/26* (2006.01)
*G05F 1/66* (2006.01)
(Continued)

(52) U.S. Cl.
CPC .................. *G05F 1/66* (2013.01); *H02J 3/14* (2013.01); *H02J 3/38* (2013.01); *H02J 4/00* (2013.01);
(Continued)

(58) Field of Classification Search
CPC ..................................... G06F 1/26; G06F 1/30
See application file for complete search history.

(56) References Cited

U.S. PATENT DOCUMENTS 7,155,320 B2   12/2006   Gee
8,315,745 B2   11/2012   Creed
(Continued)

FOREIGN PATENT DOCUMENTS

CN   102184475 A    9/2011
WO   2011040656 A1  4/2011

OTHER PUBLICATIONS

Damchi Y. et al., "Optimal Coordination of Directional Overcurrent Relays in a Microgrid System Using a Hybrid Particle Swarm Optimization", 2011 International Conference on Advanced Power System Automation and Protection, (APAP), vol. 2, pp. 1135-1138, Oct. 16, 2011.

(Continued)

*Primary Examiner* — Paul B Yanchus, III
(74) *Attorney, Agent, or Firm* — Brian Restauro; Andrew M. Calderon; Roberts Calderon Safran & Cole, P.C.

(57) ABSTRACT

An approach to provide power from power supply devices to power consuming devices based on using priority levels for each of the power consuming and supply devices. The approach includes the steps of receiving information of a power consuming device from an energy management, including criticality information obtained from a universal appliance service system. The approach further includes receiving power supply information of one or more power supply devices associated with an electric grid, and receiving a power request from the power consuming device. The approach further includes determining that the power con- (Continued)

suming device receives power from the power supply device, based on the criticality information and the power supply information.

14 Claims, 11 Drawing Sheets

Related U.S. Application Data continuation of application No. 14/030,146, filed on Sep. 18, 2013, now Pat. No. 9,515,491.

(51) Int. Cl.
*H02J 4/00* (2006.01)
*H02J 3/14* (2006.01)
*H02J 3/38* (2006.01)
*H02J 13/00* (2006.01)

(52) U.S. Cl.
CPC .... *H02J 13/00* (2013.01); *G05B 2219/25352* (2013.01); *Y02B 10/30* (2013.01); *Y02B 70/3225* (2013.01); *Y04S 20/222* (2013.01)

(56) References Cited

U.S. PATENT DOCUMENTS

| | | | |
|---|---|---|---|
| 8,321,194 B2 | 11/2012 | Meagher et al. | |
| 8,401,709 B2 | 3/2013 | Cherian et al. | |
| 9,244,446 B2 | 1/2016 | Bhageria et al. | |
| 9,455,577 B2 | 9/2016 | Bhageria et al. | |
| 9,515,491 B2 | 12/2016 | Bhageria et al. | |
| 9,733,623 B2 | 8/2017 | Yang et al. | |
| 10,268,224 B2 * | 4/2019 | Bhageria | H02J 4/00 |
| 2005/0102544 A1 | 5/2005 | Brewer et al. | |
| 2006/0084388 A1 | 4/2006 | Li et al. | |
| 2007/0124026 A1 | 5/2007 | Troxell et al. | |
| 2007/0260359 A1 | 11/2007 | Benson et al. | |
| 2008/0238710 A1 | 10/2008 | Tolnar et al. | |
| 2010/0179704 A1 | 7/2010 | Ozog | |
| 2010/0274407 A1 | 10/2010 | Creed | |
| 2011/0046806 A1 | 2/2011 | Nagel et al. | |
| 2011/0082598 A1 | 4/2011 | Boretto et al. | |
| 2011/0093127 A1 | 4/2011 | Kaplan | |
| 2011/0231028 A1 | 9/2011 | Ozog | |
| 2011/0257804 A1 | 10/2011 | Goel et al. | |
| 2011/0298286 A1 | 12/2011 | Batzler et al. | |
| 2012/0089268 A1 | 4/2012 | Torre et al. | |
| 2012/0101639 A1 | 4/2012 | Carralero et al. | |
| 2012/0330475 A1 | 12/2012 | Chen | |
| 2013/0024042 A1 | 1/2013 | Asghari et al. | |
| 2013/0041516 A1 | 2/2013 | Rockenfeller et al. | |
| 2013/0043725 A1 | 2/2013 | Birkelund | |
| 2013/0046415 A1 | 2/2013 | Curtis | |
| 2013/0076140 A1 | 3/2013 | Darden et al. | |
| 2013/0200720 A1 | 8/2013 | Murabayashi et al. | |
| 2013/0238151 A1 | 9/2013 | Vaum et al. | |
| 2014/0181949 A1 | 6/2014 | Hunter | |
| 2015/0241895 A1 | 8/2015 | Lu et al. | |

OTHER PUBLICATIONS

Kennedy J. et al., "Intelligent Load Management in Microgrids", Power and Energy Society General Meeting, 2012 IEEE, 8 pages, Jul. 22, 2012.
Roscoe, A. J. et al., "Increasing Security of Supply by the use of a Local Power Controller During Large System Disturbances", IEEE PES International Conference and Exhibition, Dec. 6, 2011, pp. 1-7.
M. Alizadeh et al., "Information Infrastructure for Cellular Load Management in Green Power Delivery Systems", 2011 IEEE, pp. 13-18.
Y. Mizuno et al., "Evaluation and Verification of an Intelligent Control System with Modeling of Green Energy Devicesby Constructing a Micro-Grid System in University Campus (report I)", Institute for Innovative Science and Technology,Nagasaki Institute for Applied Science, Nov. 11-14, 2012, 6 pages.
Christopher G. Bull, "Forging the Smart Grid—From theory to practice", 2010, 11 page.

* cited by examiner

MANAGING DEVICES WITHIN MICRO-GRIDS

FIELD OF THE INVENTION

The present invention generally relates to power distribution, and more particularly, to methods and systems for providing power from power supply devices to power consuming devices using a distributed system.

BACKGROUND

Electrical power networks include a number of different systems, such as a generation system, a transmission system, and a distribution system. The distribution system (i.e., distribution grid or distribution network) traditionally receives power from one or more high-voltage sources of the transmission system and distributes that power to feeder lines. To distribute power within the electrical power network, the distribution system can transform voltage (e.g., stepping down power from a transmission voltage level to a distribution voltage level), regulate voltage (e.g., adjusting the voltage of feeder lines as loads are added and removed), conserve power, regulate power, switch and protect different parts of the distribution system (e.g., using switches, circuit breakers, reclosers, and fuses that connect or disconnect portions of the distribution system) between different generation systems, and/or any other operations.

Technology has transformed distribution grids into decentralized systems that allow for a variety of power generation and storage components to be located at a power user's location instead of having a central location (e.g., a power plant) that provides power for all the power users. For example, premises (e.g., a home or a business) within the distribution grid may operate their own energy resources (e.g., solar cells, wind turbines, and batteries) that can also provide power to the distribution grid. An operator of the distribution grid (e.g., a utility or a third-party company) uses smart energy devices (e.g., ZigBee® of ZigBee Alliance Corp., San Ramon, Calif.) to remotely control components of the distribution grid.

SUMMARY

In a first aspect of the invention, a method for configuring micro-grids comprises the steps of receiving information of a power consuming device from an energy management system, the energy management system receives criticality of the power consuming device from a universal appliance service system. The method further comprises receiving power supply information of one or more power supply devices associated with an electric grid and receiving a power request from the power consuming device. The method further comprises determining, by a computing device, that the power consuming device receives power from the power supply device, based on the information and the power supply information.

In another aspect of the invention, a system for configuring a micro-grid includes a CPU, a computer readable storage memory, and a computer readable storage media. Additionally, the system comprises program instructions to receive information regarding one or more power consuming devices. The system also comprises program instructions to receive criticality levels for each of the power consuming device as obtained from a universal appliance service system in direct communication with an energy management system. The system also comprises program instructions to receive power supply information regarding one or more power supply devices. The system also comprises program instructions to determine that power is available from the power supply devices to operate a selected one or more of the power consuming devices. The system also comprises program instructions to place a request for power of a non-critical power consuming device of the one or more power consuming devices into a queue for a delayed operating time when there is not enough power to operate both a critical power consuming device and the non-critical power consuming device. Each of the program instructions are stored on the computer readable storage media for execution by the CPU via the computer readable memory.

In an additional aspect of the invention, a computer program product that includes a computer usage storage device that includes readable computer code embodied in the medium is provided. The computer program product comprises at least one component operable to receive power consumption information for a power consuming device from a third party. The computer program product comprises receiving, from an EM system, a location, an identifier, and a device type for the power consuming device. The computer program product comprises determining electrical characteristics of the power consuming device based on the power consumption information, and the identifier and the device type received from the EM system. The computer program product comprises determining criticality of the power consuming device based on the power consumption information and the location, the identifier and the device type received from the EM system. The computer program product comprises sending the criticality of the power consuming device to the EM system.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
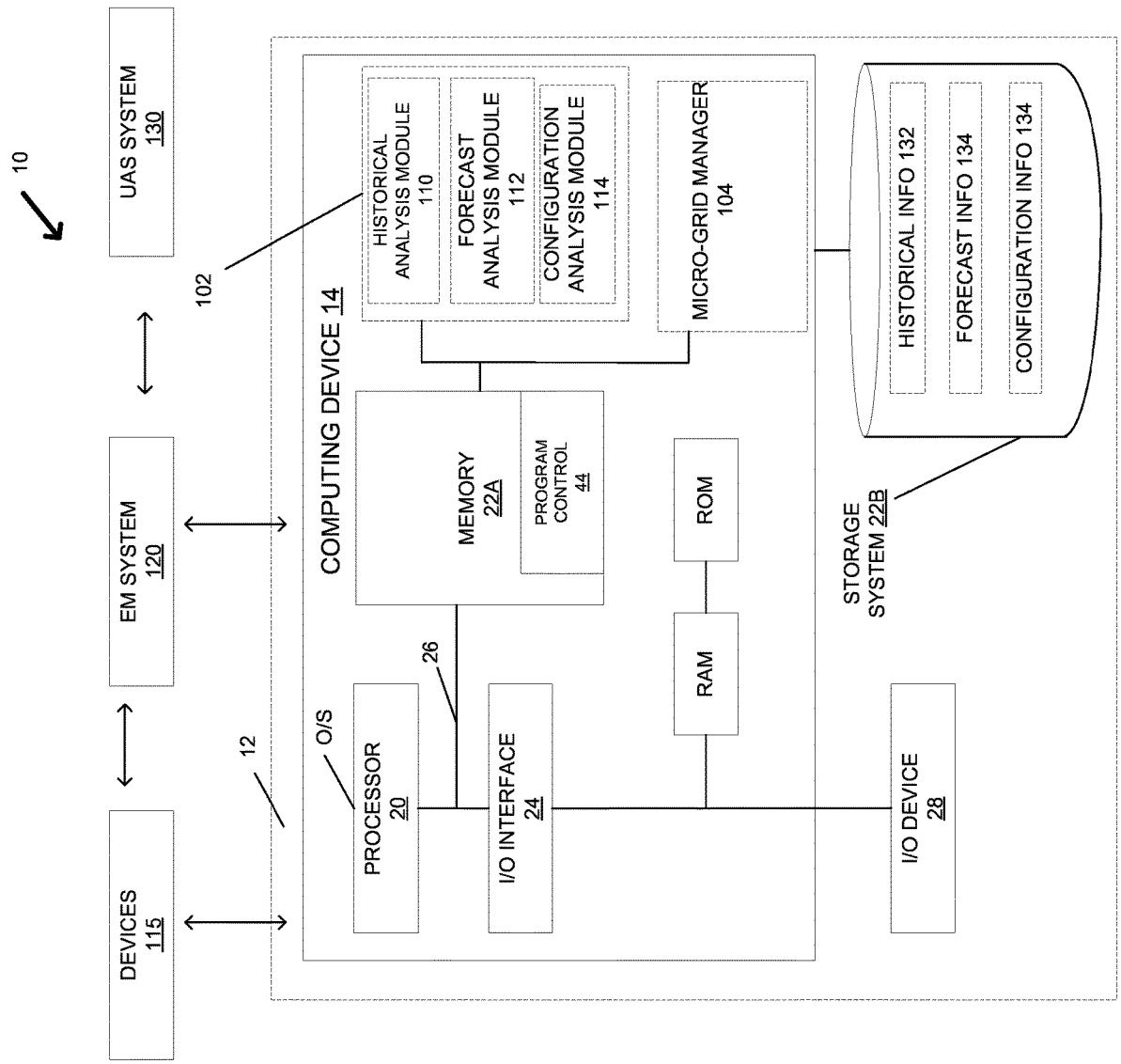
FIG. 1 shows an illustrative environment for implementing the steps in accordance with aspects of the invention.

The present invention generally relates to electrical power distribution, and more particularly, to methods and systems for providing power from power supply devices to power consuming devices using a distributed system. In embodiments, the distributed system utilizes priorities for each of the power consuming devices and supply devices received from a management system. In embodiments, the present invention also utilizes a universal appliance service (UAS)

system to provide an energy management (EM) system with electrical characteristics for power consuming devices and power supply devices that are registered with the EM system. In embodiments, the UAS system stores device information in a central location as received from the devices or a third party, e.g., device manufacturer, electrical utilities, insurance companies, etc.

The UAS system ensures that devices are not given electrical characteristics and priorities which are being defined differently by different parties and/or users associated with the micro-grid. The UAS system can provide such information to the EM system. In turn, the EM system can determine priorities for power consuming devices used within the micro-grid, based on the criticality level of the device. For example, the EM system uses the priorities and the electrical characteristics of the power consuming devices or power supply devices to generate load profiles and/or power supply profiles for one or more devices. In this way, the present invention is a decentralized system that ensures sustainability, reliability, and power quality within a micro-grid by generating load profiles based on the currently available power supply output and reserves. Thus, advantageously, the invention results in optimizing the power generation within a micro-grid to provide service to the maximum number of critical and non-critical power consuming devices.

In embodiments, a power demand associated with one or more different power consuming devices (e.g., air-conditioning unit, a washer, etc.) can be compared to the amount of available power from one or more different power supply devices in order to supply electrical power and manage an electric micro-grid system. The management may take into account, for example, an amount of available power in the micro-grid, the criticality level of the power consuming device (e.g., critical, non-critical), the location of the power consuming device and/or power supply device, the time of day, the customer characteristics, and/or reliability and power quality issues for the micro-grid. The criticality information can be provided by the UAS system which can determine different criticality levels of different devices. Also, the UAS system may determine criticality levels for a power consuming device based on the type of device, the location of the device, and/or any special event (e.g., hurricane, earthquake, etc.) that is occurring at a particular time. This information can now be stored in the UAS system without the EM system receiving such information directly from the particular devices. This ensures that the EM system receives uniform and accurate information for each of the devices. Accordingly, implementations of the invention configure, manage, and monitor micro-grids.

In embodiments, the EM system can provide profiles (e.g., load profiles and power supply profiles) of devices to the micro-grid manager. In embodiments, the EM system is provided on a consumer side, e.g., at the device location in the micro-grid, and receives device information from the UAS system. The UAS system can store device profiles in a central location, such that the EM system may no longer need to query each individual device for their profiles or criticality information, as described herein. Using this information, the micro-grid manager can then determine which devices can operate based on how much power is available and the associated profiles of the device as information is received from the EM system.

In embodiments, the EM system may store different profiles for the same device, depending on different criteria. In embodiments, the profile may include electrical characteristics of the devices, criticality level of the device, device identifier (ID) and other information. The EM system may receive the criticality level of the device from the UAS system. The EM system may also receive electrical characteristics (e.g., power consumption or supply values given in kilowatts, megawatts, etc.) from the UAS system for different devices. The profile may be used to control operation of one or more power consuming devices and/or one or more power supply devices based on the time of day, time of season, etc., or other characteristics of the device or electrical grid. The micro-grid manager can generate control information and send this information to the EM system or vice versa. The EM system can control the power consuming devices and/or the power supply devices.

In embodiments, the load profile may include information about: (i) the amount of load (e.g., the power demand) requirements at different times (e.g., a load requires 100 kilowatts of power from 9:00 a.m. to 4:00 p.m. and 25 kilowatts of power from 4:00 p.m. to 5:00 p.m.), or (ii) device characteristics for different times, e.g., output temperature for chilled water from a chiller or output temperature of heat from electric heat strips in an air handling unit, of the load. The load profile may be used to isolate or identify a critical power consuming device, e.g., a life support device, and/or a non-critical power consuming device, e.g., a television. A power supply profile, on the other hand, may include information about the amount of power supply provided by a power supply device at different times or other criteria. In embodiments, a user may enter the load profile into the EM system, which in turn may send (e.g., publish) the load profile to a micro-grid manager. Based on the load profile, the micro-grid manager may determine if there is enough power available for the devices described within the load profile. If not, the micro-grid manager may disable non-critical power consuming devices and divert power to the critical power consuming device.

As it should be understood, a micro-grid is a self-sufficient island that is electrically isolated (i.e., islanded) from the rest of a distribution grid and that includes sufficient energy resources to satisfy power demanded by consuming devices within the micro-grid. For example, an area of a distribution grid may include one or more premises (e.g., residences, offices, or facilities) including devices that consume electrical power (e.g., lights and appliances) and energy resources that provide electrical power (e.g., fuel cells, micro-turbines, generators, solar cells, wind turbines, etc.). A micro-grid may include a subset of the premises that, in combination, produce sufficient power to meet the total power consumed within the subset of the premises. A utility operator, or another type of third-party operator (e.g., a utility customer with their own generation or co-generation system, or an independent power producer), may create the micro-grid by opening switching elements in the distribution grid that electrically isolate the premises within an area of the distribution grid from the remainder of the distribution grid.

In embodiments, a utility provider can dynamically create and/or reconfigure micro-grids to minimize the number of customers affected by an event that disrupts power delivery to portions of a distribution grid. Such events may include maintenance, construction, severe weather, natural disasters, man-made disasters, etc. For example, in response to a snowstorm that causes parts of the distribution grid to fail, the utility operator (e.g., a power provider, distributer, and/or manager) may remotely control switches (e.g., using supervisory control and data acquisition (SCADA) controllers) installed in the distribution grid to configure and establish one or more micro-grids. After the disruption ends (e.g., the damage has been repaired), the utility operator may reconfigure the distribution grid to dissolve the micro-grids without affecting the stability and reliability of the distribution grid.

Further, aspects of the invention manage micro-grids by dynamically controlling distributed energy resources and energy consumption devices at premises within the distribution grid (e.g., homes and business locations). For example, the disclosed systems and methods may monitor conditions within a micro-grid and, in response to changes in the conditions (e.g., changes in or supply or demand), issue commands to remotely modify (i.e., tune) the operation of the devices within the micro-grid to generate or consume more or less power. By doing so, the utility operator enhances the reliability and robustness of the service provided to its customers. Additionally, the utility operator can maximize the use of local energy resources to satisfy the local energy demand, thereby reducing potential environmental negative impacts of power generation (e.g., soot from coal-fired power plants).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium and/or device (hereinafter referred to as computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, environment 10 includes a server 12 or other computing system, devices 115, energy management (EM) system 120, and UAS system 130.

In embodiments, the EM system can be part of device 115, and can be used to provide profiles for the server 12, e.g., micro-grid manager 104. The devices 115 can be, e.g., either power consuming devices or power supply devices. By way of non-limiting examples, power supply devices can be generators, turbines, fuel cells, micro-turbines, or any other type of device that generates power. By way of non-limiting examples, power consuming devices may be any device that consumes power, such as lighting, cooling systems, motors, pumps, machinery and/or any other type of power consuming device.

In embodiments, the power consuming devices can be either critical or non-critical devices. By way of non-limiting examples, a critical power consuming device may be any device used to provide heat, cooling, lighting, pumping, and/or any other operation that is used at governmental or medical facilities, e.g., hospital, police station, or prison, as well as devices used to provide support during catastrophic events (e.g., a hurricane, an earthquake, etc.). For example, critical power consuming devices may be a particular type of medical equipment within a hospital, lighting systems at a prison, and/or pumping systems at a fire station. On the other hand, a non-critical power consuming device may be a television or any other type of device not associated with a critical power consuming device.

In particular, computing system 12 includes a computing device 14. Computing device 14 can be resident on a network infrastructure or computing device of a third party service provider (any of which is generally represented in FIG. 1). Computing device 14 also includes a processor 20, memory 22A, an I/O interface 24, and a bus 26. Memory 22A can include local memory employed during actual execution of program code, bulk storage, and cache memories which provide temporary storage of at least some program code in order to reduce the number of times code must be retrieved from bulk storage during execution. In addition, computing device 14 includes random access memory (RAM), a read-only memory (ROM), and an operating system (O/S).

Computing device 14 is in communication with external I/O device/resource 28 and storage system 22B. For example, I/O device 28 can include any device that enables an individual to interact with computing device 14 (e.g., user interface) or any device that enables computing device 14 to communicate with one or more other computing devices using any type of communications link. External I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a configuration engine 102 and/or a micro-grid manager 104, e.g., the processes described herein. Configuration engine 102 and micro-grid manager 104 can be implemented as one or more program code in program control 44 stored in memory 22A as separate or combined modules. Additionally, configuration engine 102 and micro-grid manager 104 may be implemented as separate dedicated processors or a single or several processors to provide the function of these tools. Further, configuration engine 102 and micro-grid manager 104 (along with their respective data and modules) can be implemented in separate devices. Moreover, configuration engine 102 and micro-grid manager 104 (along with their respective data and modules) can be implemented in different planes of a network (e.g., a control plane and a service plane).

In accordance with aspects of the invention, configuration engine 102 is hardware, software, or a combination thereof that configures a micro-grid within a distribution grid. In embodiments, configuration engine 102 determines demand by consuming devices within the micro-grid and whether such demand can be met within that micro-grid. Energy consuming devices include, for example, home appliances, lighting, electric vehicles, etc. The energy resources include variable energy resources (VERs) and distributed energy resources (DERs), including, e.g., generators (e.g., gas, wind, solar, etc.) and energy storage devices (e.g., electric batteries, fuel cells, electric vehicles, etc.).

In embodiments, configuration engine 102 issues messages to control elements of the distribution grid (e.g., switches connected to SCADA controllers) in order to modify the topology of the electrical distribution network and create or modify the micro-grid. For example, the configuration engine 102 may dynamically modify a micro-grid by reducing the number of connected premises and/or consuming devices within the micro-grid based on current conditions (e.g., weather, load, power generation, etc.) within the distribution grid.

Still referring to FIG. 1, in accordance with aspects of the invention, the configuration engine 102 includes a historical analysis module 110, a forecast analysis module 112, and/or a configuration analysis module 114. Historical analysis module 110 is hardware, software, or a combination thereof that analyzes historical information, such as historical information 132 in storage system 22B. In embodiments, historical information 132 may be collected from devices 115, such as power supply devices (e.g., micro-turbine, generator, etc.) and/or power consuming devices (e.g. motors, life-support systems, MRI machine, lighting, etc.), associated with the distribution grid and/or third-party sources.

In embodiments, historical information 132 may be collected from EM system 120, which receives this information directly from devices 115. Historical information 132 includes, for example, past weather conditions (e.g., temperature, precipitation, wind directions and forces, barometric pressure, and sky conditions), electrical conditions (e.g., voltage, current, real, reactive, and apparent power), network topology, power outage information, communications' infrastructure information (e.g., operating status, location, clients), and asset information (e.g., identification, host network, location). Historical analysis module 110 aggregates, correlates, filters, and/or enriches historical information 132 using conventional data analysis techniques. For example, historical analysis module 110 may average power demand data at different locations (e.g., premises) over a time period to generate a digest of historical information 132 that associates locations of a distribution grid (including micro-grids) with power demand at different time frames (e.g., monthly, daily, hourly, etc.).

Forecast analysis module 112 is hardware, software, or a combination thereof that combines historical information (e.g., the digest of historical information determined by historical analysis module 110) and forecast information, such as forecast information 134 in storage system 22B, to determine forecasted near-term conditions in the electrical network. Forecast information 134 may be information generated by the utility operator and/or obtained from third-party sources. For example, forecast information 134 includes weather forecast information, local forecast information, and power generation forecast information (including wind, solar, temperature, etc.). Forecast analysis module 112 may analyze forecast information 134 using one or more predefined models to forecast near-term conditions of the distribution grid. For example, based on energy consumption profiles and energy generation profiles, forecast analysis module 112 generates a data structure that associates locations (e.g., premises) of an electrical grid (including micro-grids) with predicted power demand at different times in the near-future (e.g., days, hours, minutes, etc.). The generated forecast may be continually and/or periodically updated (e.g., in real-time).

Configuration analysis module 114 is hardware, software or a combination thereof that determines network topology, including micro-grid configurations, based on historical information, forecast information and/or the current state of the distribution grid. In embodiments, based on the forecasted near-term conditions determined by forecast analysis module 112, configuration analysis module 114 determines configuration information 136, which defines locations (e.g., premises) that can be electrically isolated into one or more micro-grids that include energy resources (e.g., distributed and/or variable energy resources, such as wind turbines) that can generate a greater amount of power than consumed by energy consuming devices (e.g., appliances) operating within the micro-grid. Configuration analysis module 114 may analyze the near-term forecast information and/or the current state information using conventional techniques. For, example, configuration analysis module 114 may analyze the information using data event and data pattern matching, graphs exploration, Monte-Carlo simulation, stochastic and Las Vegas algorithms, approximation and genetics heuristics using rules-based or model-based datasets, to aggregate, correlate and analyze the above real-time and historical information sources to define the optimal network configuration for micro-grids. An optimal configuration for a micro-grid may include a mix of energy resources and energy consuming devices that maximize the number of users in one or more micro-grids.

In accordance with aspects of the invention, micro-grid manager 104 is hardware, software, or a combination thereof that implements and manages micro-grids. In embodiments, micro-grid manager 104 obtains configuration information 136 generated by configuration engine 102 and, based on that information, issues commands to devices within the distribution grid to open switches that isolate one or more portions into a micro-grid. Further, in embodiments, micro-grid manager 104 manages micro-grids by ensuring that demand by power consumers within a particular micro-grid is satisfied by the power providers within that micro-grid. In implementations, using analysis techniques similar to configuration engine 102, micro-grid manager 104 may combine current (e.g., real-time) information received from devices and/or systems in a micro-grid with historical information and forecast information to dynamically tune the performance of energy resources and power consumers within the micro-grid. For example, based on current temperature information received from one or more devices in the distribution grid, micro-grid manager 104 may communicate with smart appliances (e.g., water heater and air conditioner) in a home area network of premises in the micro-grid and control them to reduce their power consumption.

In embodiments, micro-grid manager 104 may receive electrical power consumption information from devices 115 via EM system 120, e.g., power supply devices and/or power consuming devices that are registered with micro-grid manager 104. In embodiments, EM system 120 can generate profiles and send the profiles to micro-grid manager 104.

EM system 120 can receive various types of information associated with power consuming devices and/or power supply devices to control the power consuming devices and/or the power supply devices within the micro-grid system. More specifically, EM system 120 can receive location information and identifier information from the power consuming devices and use this information to request the criticality of a power consuming device and/or electrical characteristic information for different power consuming and supply devices from UAS system 130.

In embodiments, EM system 120 may include an application programming interface (API) that allows for EM system 120 to communicate with UAS system 130. In further embodiments, UAS system 130 may include one or more computing devices, with each computing device associated with one entity or different entities. An entity could be a utility, a manufacturer of a power consuming and/or supply device, a company that manages the micro-grid, or any other third party entity. In this and other implementations, UAS system 130 may receive a request from EM system 120 to determine the criticality level of the power consuming device.

In embodiments, UAS system 130 can receive and store information about different power consuming devices and power supply devices. The information may include power consumption information, power supply information, identification numbers, model number, year of manufacture, type of device (e.g., a generator, a chiller, a washing machine, a refrigerator, etc.), and/or any other information describing the mechanical and electrical characteristics of the device. Using this information, UAS system 130 can determine the criticality level of the devices.

As an example, UAS system 130 can use information relating to the type of device as a factor in determining a power consuming device's criticality level, e.g., a dialysis machine will have a greater criticality level than a gaming system. Additionally, or alternatively, UAS system 130 can use information relating to the location of the device as a factor in determining a power consuming device's criticality level. For example, a power consuming device located at a hospital can have a greater criticality level than a power consuming device located at a restaurant. Additionally, or alternatively, UAS system 130 can use information relating to the particular time of day, month, year or other time period as a factor in determining a power consuming device's criticality level. EM system 120 can update the load profile based on the change in criticality and send the change in criticality to micro-grid manager 104.

Additionally, or alternatively, UAS system 130 can use information relating to particular events as a factor in determining a power consuming device's criticality level. UAS system 130 may have information about a device that receives information about emergency events, such as hurricanes, tornados, snowstorms, earthquakes, etc. UAS system 130 may use this information to change the criticality level of a power consuming device and send the change in criticality to EM system 120. EM System 120 can update the load profile based on the change in criticality and send the change in criticality to micro-grid manager 104. For example, during a natural event, e.g., hurricane, a school may be used as a makeshift hospital or shelter and, as such, the lighting and heating systems may be reclassified as critical. By doing so, micro-grid manager 104 may ensure that sufficient energy is produced in the micro-grid to power devices that may operate within the micro-grid.

In embodiments, UAS system 130 can use known algorithms to determine the criticality level. Also, in embodiments, UAS system 130 can use inputs received from a user that assign criticality levels to different types of power consuming devices. For example, a user may input a higher criticality level for power consuming devices located at a hospital than at a supermarket. Also, in any of the embodiments, the criticality levels may be provided as numerical values. e.g., a higher numerical value may indicate a higher criticality level.

UAS system 130 can receive device information, e.g., electrical characteristic information, etc., from a device manufacturer, or directly from the device. Preferably, the device information is received from a verifiable source, e.g., a device manufacturer to ensure the integrity of the device information. This also ensures that the device information is uniform amongst the same types of device, which prevents any manipulation of the device information at the customer side. UAS system 130 can send the criticality information and/or the electrical characteristic information to EM system 120, which uses the criticality information and/or the electrical characteristics to generate a profile for the power consuming device and the power supply device. For example, EM system 120 can use the electrical characteristic information to assign power consumption values (e.g., 10 kilowatts, 100 kilowatts, etc.) to power consuming devices and assign power supply values (e.g., 100 kilowatts, 1 megawatt, etc.) to power supply devices. EM system 120 may store one or more different profiles that are associated with one or more power consuming devices and/or power supply devices 115.

The profiles may be configured by EM system 120 or by a user of EM system 120, by using historical information, current information and forecast information. EM system 120 may include a graphical user interface (GUI) that allows for a user to make changes (e.g., by using a keypad, a touch screen, voice activated commands, etc.) to different profiles stored by EM system 120, as well as other types of configurations associated with the power consuming devices and/or the power supply devices. EM system 120 may publish, e.g., generate and send, the profiles to micro-grid manager 104 which subscribes to information from EM system 120. EM system 120 can send this information to micro-grid system 104 via any known communication network.

EM system 120 may be operated by the user of the power consuming devices and/or the power supply devices. Alternatively, EM system 120 may be operated by a utility company or a demand response program supplier. In embodiments, EM system 120 and micro-grid manager 104 are managed and operated by the same group. In other embodiments, EM system 120 may be a part of one or more devices 115.

Upon receiving the power consumption and supply information, micro-grid manager 104 may update network connectivity information for the micro-grid. The network connectivity information can include information about the total number of power consuming devices and power supply devices connected within the micro-grid as well as devices connected to each other. Micro-grid manager 104 can receive this information in real time and use this information to determine a real time electrical state of the micro-grid. For example, micro-grid manager 104 may use this information to determine if a power quality level or power flow level reaches a threshold (e.g., 75%, 85%, 90%, etc.). Micro-grid manager 104 may also determine the network topology to determine the power flow and the power quality. If the power flow and/or the power quality thresholds are not met, then micro-grid manager 104 may initiate different actions that result in the thresholds being met. Once the thresholds are met, micro-grid manger 104 may process requests to initiate and/or disable power consuming devices or power supply devices.

In embodiments, micro-grid manager 104 can receive a request or make a determination based on a profile analysis, to: (1) provide power to a power consuming device; (2) stop providing power to a power consuming device; (3) add a power supply device to provide power to the micro-grid; (4) deny power to the power consuming device; (5) divert power from one power consuming device to another power consuming device; and/or (6) ramp up power to reserve power supply devices to provide the additional power. The request may include electric power consumption information and/or power supply information and may be sent from EM system 120. EM system 120 can then be used to control the micro-grid by manipulating the electrical load of each of the devices, based on received information from the micro-grid.

Micro-grid manager 104 may also determine to provide power based on whether the power is being requested by a critical or non-critical power consuming device. In embodiments, UAS system 130 can receive information of the devices, including whether they are critical or non-critical devices, in which case such information can be provided to micro-grid manager 104, via EM system 120. For example, micro-grid manager 104 may divert power to the critical power consuming device from a non-critical power consuming device or provide controls to receive power generated by a reserve power supply device which is standby mode. Alternatively, micro-grid manager 104 may provide controls to provide power to a non-critical power consuming device if there is available power from the power supply devices. However, when there is no available power, or insufficient available power, the micro-grid manager can use a profile that uses less power that may provide power depending on the criticality level of the power consuming device. In the latter situation, micro-grid manager 104 may send a message to the user of the power consuming device that power is not available. The message may be sent to an EM system and/or any other computing device (e.g., a smart phone, a laptop, a PDA device, etc.).

In embodiments, micro-manager 104 may simulate changes to the micro-grid to determine whether the micro-grid can remain reliable and sustainable in providing power to the power consuming devices. If the simulation determines the micro-grid can maintain its reliability and sustainability (e.g., power quality levels, power flow, etc.), micro-grid manager 104 may send control information to the power demand devices and/or to the power supply devices. In embodiments, micro-grid manager 104 can send the control information directly to the power demand devices and/or to the power supply devices, or alternatively, to EM system 120. EM system 120 can then use the control information to change the load profile of the device (stored by the EM system) in order to change the operation of a load and/or a power supply device. If the simulation is not successful, e.g., reliability and sustainability cannot be met, micro-grid manager 104 can manipulate the devices, e.g., increase power, supply with decreased power consumption of other devices, to enhance the reliability and sustainability model. This information can be sent as control information to EM system 120.

Although micro-grid manager 104 is shown in FIG. 1 as being incorporated in server 12 along with configuration engine 102, micro-grid manager 104 can be implemented on a separate server or other computing device. For example, configuration engine 102 can be part of a utility operator's centralized distribution and/or control infrastructure of a distribution grid, and micro-grid manager 104 can be part of a service plane that communicates with devices (e.g., a presence server) in a control that services devices in a user/transport plane.

In embodiments, configuration engine 102 and micro-grid manager 104 operate in real-time. In the context of this disclosure, "real-time" is processing information at a rate that is approximately the same or faster than the rate at which the system receives information from one or more devices operating in the system. For example, if a real-time system receives information at a frequency of 1 Hertz, the system outputs information at approximately 1 Hertz or faster under normal operating conditions.

While executing the computer program code, processor 20 can read and/or write data to/from memory 22A, storage system 22B, and/or I/O interface 24. The program code executes the processes of the invention. Bus 26 provides a communications link between each of the components in computing device 14.

Computing device 14 can include any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure is only illustrative of various types of computer infrastructures for implementing the invention. For example, in embodiments, computing system 12 includes two or more computing devices (e.g., a server cluster) that communicate over any type of communications link, such as a network, a shared memory, or the like, to perform the process described herein. Further, while performing the processes described herein, one or more computing devices on computing system 12 can communicate with one or more other computing devices external to computing system 12 using any type of communications link. The communications link can include any combination of wired and/or wireless links; any combination of one or more types of networks (e.g., the Internet, a wide area network, a local area network, a virtual private network, etc.); and/or utilize any combination of transmission techniques and protocols.

Figure 2:
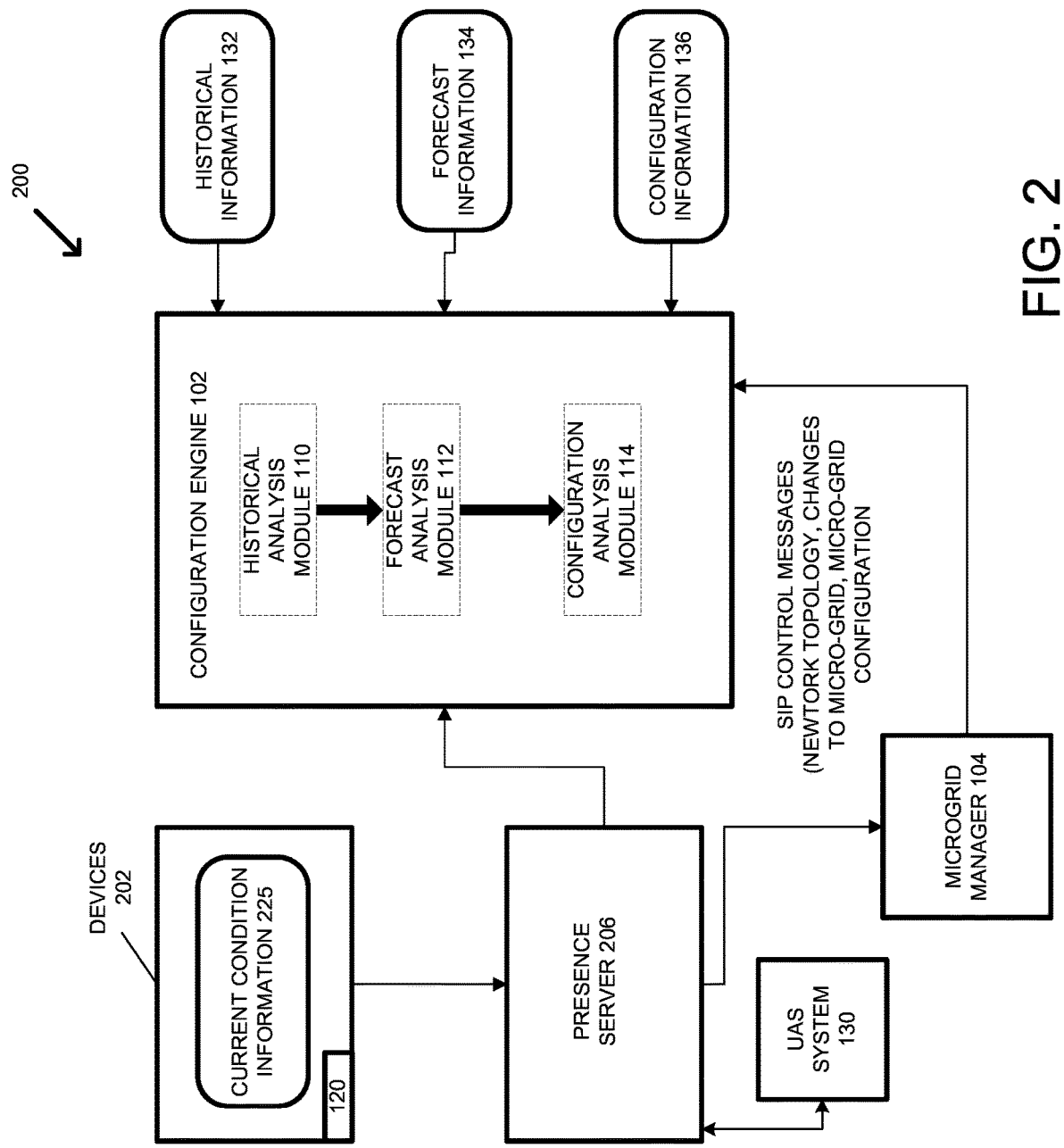
FIG. 2 shows a functional block diagram of an environment for configuring micro-grids in accordance with aspects of the invention.

FIG. 2 shows a functional block diagram of an exemplary environment 200 for configuring micro-grids in accordance with aspects of the invention. Environment 200 includes one or more devices 202, one or more presence servers 206, configuration engine 102, micro-grid manager 104, and UAS system 130. Devices 202 may be power supply devices (e.g., a power generator or power storage) and/or power consuming devices (e.g., powered appliances) within a distribution grid. According to further aspects, devices 202 are home-area network-enabled devices (e.g., smart devices) that include network communications interfaces through which the devices may exchange information and/or receive commands using, e.g., SIP or MQTT protocol messaging. For example, devices 202 may be devices 115 shown and described in FIG. 1 (such as power consuming devices and power supply devices) within the distribution grid. The devices may include EM system 120. EM system 120 can receive criticality levels and electrical characteristics of different power consuming and supply devices from UAS system 130 through presence server 206. For example, UAS system 130 receives device information from devices 202 or EM system 120 through presence server 206.

In embodiments, EM system 120 can receive device identification, location information, type of device information, and other information from each individual device. This information can then be provided to UAS system 130, which makes a determination of the criticality of each individual device. In embodiments, UAS system 130 can receive device information, e.g., device type, locations, etc., from a third party source. Using this third party source information, in combination with the device characteristics, e.g., identifier, location, etc., received from EM system 120, UAS system 130 can then make a determination of criticality. UAS system 130 can also determine the power consumption for power consuming devices and power supply output characteristics of power supply device. This information along with the criticality information can then be provided to EM system 120. EM system 120 can then use this obtained information to generate power consuming profiles and power supply profiles. These profiles are then sent to micro-grid manager 104 which uses these profiles to determine which power consuming devices are to receive power and which power supply devices are to generate power. The information sent between micro-grid manager 104, EM system 120, and UAS system 130 can be sent and/or processed through presence server 206.

As shown in FIG. 2, devices 202 may communicate via presence servers 206 to provide current condition information 225 (e.g., on/off state, power, voltage, current, faults, service information, etc.) to configuration engine 102 (which may be relayed through micro-grid manager 104). Additionally, devices 202 may receive commands (e.g. SIP control messages) from e.g., micro-grid manager 104 that control devices 202 to modify their operation (e.g., power consumption or/or power generation).

Presence server 206 is software, a system, or combination thereof that accepts, stores and distributes SIP presence information from SIP entities. For example, presence server 206 is a SIP presence server that registers micro-grid manager 104 (e.g., as a watcher application) and devices 202 (e.g., as presentities). As such, the SIP entities illustrated in FIG. 2 can subscribe, publish, and acknowledge information or commands via SIP messages.

According to aspects of the invention, configuration engine 102 determines micro-grids based on historical information 132, forecast information 134, and/or current condition information 225. Current condition information 225 is information received from one or more devices in the electrical grid (e.g., device 202) that describes the current state of the network. Current condition information 225 includes, for example, information such loads, topology information (e.g., identity, host network, location, tie-line), weather, state (on/off, power, voltage, current, impedance, temperature), and network communication status. In embodiments, configuration analysis module 114 determines an optimal micro-grid configuration based on information determined by historical analysis module 110 and forecast analysis module 112. Historical analysis module 110 analyzes historical information 132 to determine a digest of historical information. Forecast analysis module 112 analyzes forecast information 134 and/or the output of the historical analysis module to determine a forecast of near-term conditions in the distribution grid (e.g., devices and their respective power supply and/or demand). Using the forecast of near-term conditions determined by forecast analysis module 112, configuration analysis module 114 determines potential micro-grids.

Still referring to FIG. 2, in accordance with aspects of the invention, micro-grid manager 104 issues SIP control messages based on the configuration information (e.g., configuration information 136) determined by configuration engine 102. The SIP control messages can include information such as network topology changes, changes to the micro-grid configuration, and/or changes to power generations and/or consumption parameters of devices in the micro-grid. For example, after configuration information 136 is determined, the utility operator may review the information and initiate the configuration changes in the distribution grid. Upon initiation, micro-grid manager 104 receives configuration information 136 (e.g., from configuration engine 102 or storage device 22B) and issues commands to the distribution grid to create or modify one or more micro-grids. In embodiments, micro-grid manager 104 transmits SIP control messages (e.g., via presence server 206) that control topology elements (e.g., as switches, fuses and sectionalizers connected to SCADA controllers) to isolate some or all devices 202 into a micro-grid.

Notably, FIG. 2 illustrates an embodiment in which micro-grid manager 104 uses SIP messages to exchange information with devices 202 and presence server 206. However, embodiments of the invention are not limited to this example. As discussed in greater detail below, embodiments may instead use MQTT-messaging or any other suitable communication protocol. Further, as noted above, configuration engine 102 and micro-grid manager 104 may be incorporated in a single system.

Figure 3:
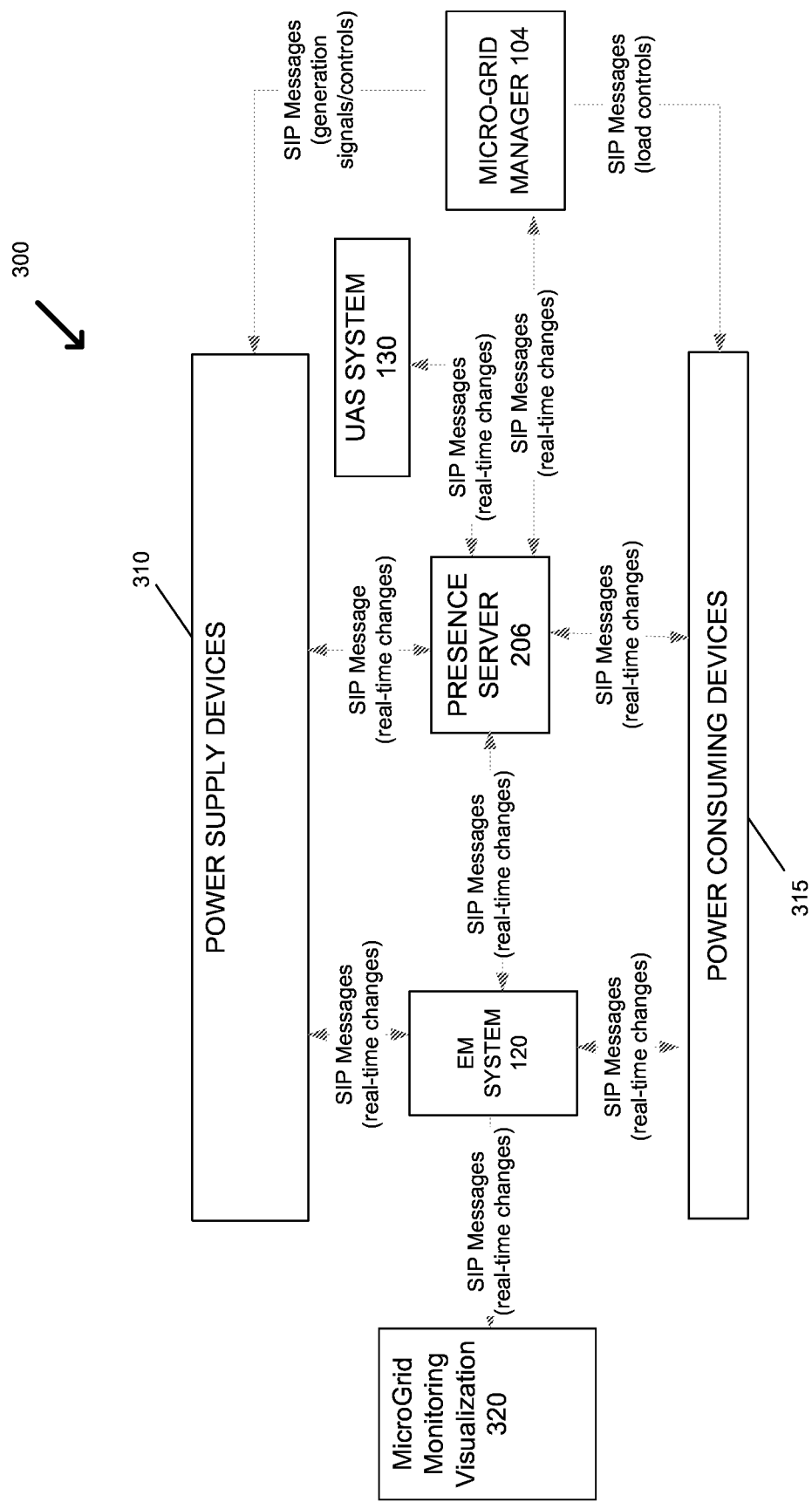
FIG. 3 shows a functional block diagram of an exemplary environment for managing a micro-grid using Session Initiation Protocol (SIP) in accordance with aspects of the invention.

FIG. 3 is a functional block diagram illustrating an exemplary environment 300 for managing a micro-grid using SIP messaging in accordance with aspects of the invention. As shown, micro-grid manager 104 can be communicatively linked with components of exemplary environment 300, including UAS system 130, presence server 206, power supply devices 310 (e.g. devices 115), power consuming devices 315 (e.g., devices 115), micro-grid monitoring and visualization devices 320, and EM system 120. Power supply devices 310 are systems and devices that provide power to the micro-grid, including electric vehicles (e.g., a plug-in electric vehicle or a plug-in hybrid electric vehicle), variable energy resources (e.g., solar cells, wind turbines), and energy storage devices (e.g., batteries, storage capacitors, and fuel cells). Power consuming devices 315 are devices that consume energy (e.g., home appliances, water heaters, swimming pools, programmable controllable thermostats, etc.).

In accordance with aspects of the invention, power supply devices 310 and power consuming devices 315 are network-enabled devices that can form a home-area-network in which the clients (e.g., power supply 310 and power consuming devices 315) use SIP messaging. For example, home area network-enabled power supply devices 310 and power consuming devices 315 devices can register with presence server 206 (e.g., using direct SIP registration with a SIP registrar or using a Zigbee® interface), via EM system 120. In embodiments, EM system 120 can receive criticality levels of different power consuming devices and electrical characteristics for power consuming or supply devices from UAS system 130.

Micro-grid manager 104 communicates with power supply 310, power consuming devices 315, micro-grid monitoring and visualization devices 320, EM system 120, and/or presence server 206, using SIP messaging. The SIP messages may be communicated over an information network, such as a wide area network or the Internet, using, e.g., HTTP or HTTPS. Additionally, the SIP messages can be encrypted using secured SIP and IPSec. Micro-grid manager 104 registers with a SIP registrar (e.g., presence server 206) and subscribes to SIP notifications and messages issued by the various connected home area network devices that belong to the micro-grid. By doing so, micro-grid manager 104 functions as a SIP watcher of power supply devices 310, power consuming devices 315, and/or micro-grid monitoring and visualization devices 320.

Micro-grid manager 104 monitors and controls devices in the micro-grid to ensure that power supply 310 assigned to the micro-grid provide sufficient power to supply power consuming devices 315 that are also within the micro-grid. For example, based on the topology of the micro-grid and current conditions (e.g., current conditions information 225) received in SIP messages issued by the devices in a micro-grid (such as devices 202), micro-grid manager 104 calculates the current conditions of the monitored micro-grid (e.g., the actual or estimated reactive and actual power, voltage, current, etc.). That is, micro-grid manager 104 determines the power flow of the micro-grid based on the current (e.g., real-time) information provided by power supply devices 310 and power energy consuming devices 315.

Based on the current conditions, micro-grid manager 104 can modify the energy production of power supply 310 (increased output) and/or reduce the energy consumption of power consuming devices 315 (e.g., decrease the output or shut off appliances, such as air conditioners) to balance the supply and demand of the micro-grid. In the event the supply or demand of the micro-grid cannot be balanced such that the micro-grid is self-sufficient, the micro-grid manager may initiate a change in the micro-grid's configuration by configuration engine 102 (shown in FIG. 1).

Micro-grid monitoring and visualization devices 320 are software, hardware, or combination thereof that gather and present information from one or more of micro-grid manager 104, power supply devices 310, power consuming devices 315 and presence server 206. For example, via micro-grid monitoring and visualization devices 320, an employee of the utility operator (e.g., a distribution dispatcher) may use a centralized advanced monitoring visualization application to view the state of all or set of micro-grids that it managed by one or more micro-grid managers. Further, the utility operator and/or its users can ascertain the current state of micro-grids through advanced visualization watcher applications, which improves the situational awareness of users and utility operator.

Figure 4:
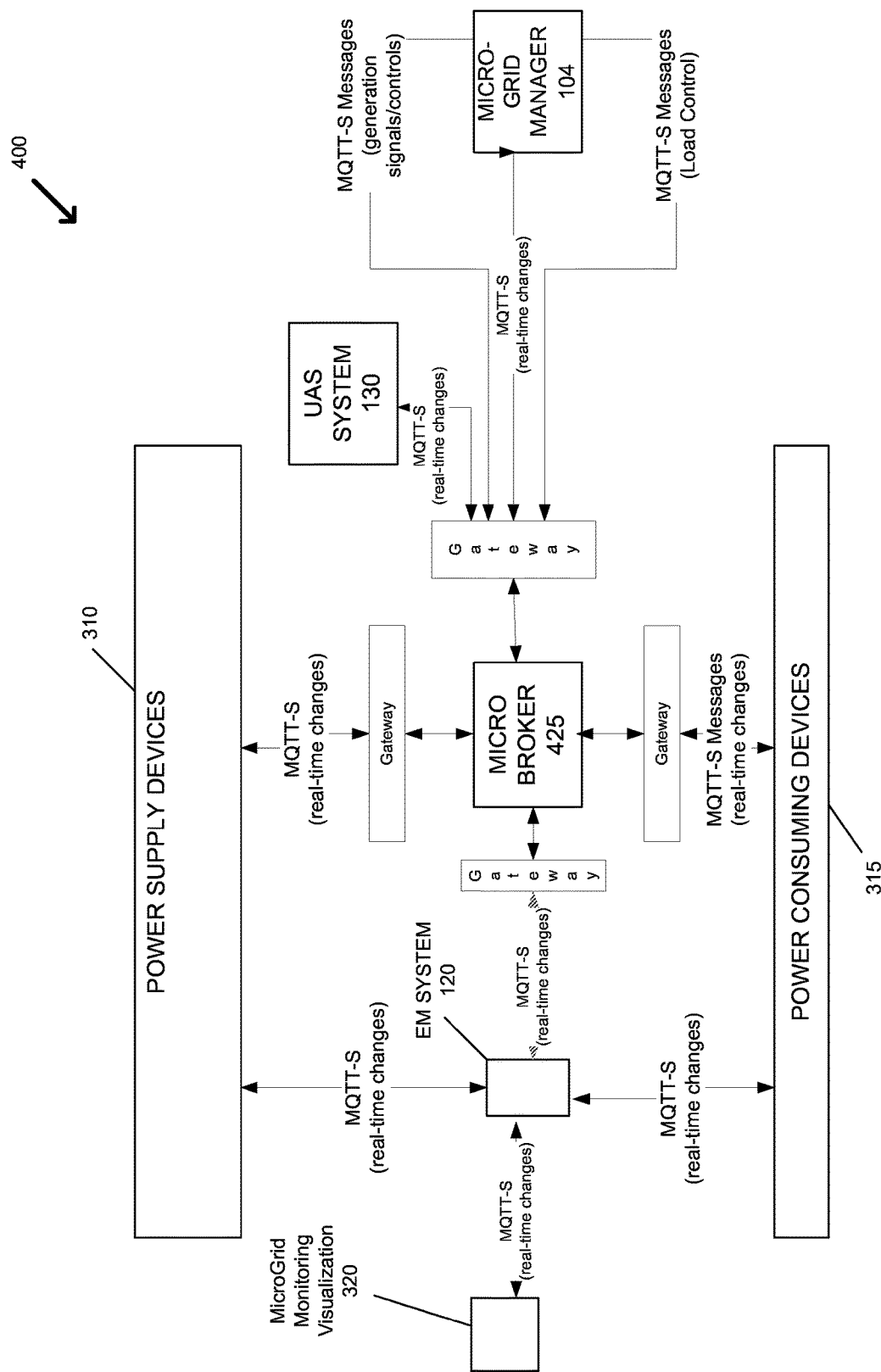
FIG. 4 shows a functional block diagram of an exemplary environment for managing a micro-grid using Message Queue Telemetry Transport (MQTT) protocol in accordance with aspects of the invention.

FIG. 4 is a functional block diagram illustrating a system in accordance with aspects of the invention that uses MQTTs and/or MQTT messaging to manage micro-grids in an electrical network. The exemplary embodiment depicted in FIG. 4 includes a micro-grid manager 104 communicatively linked with components of the exemplary environment 400, including power supply devices 310, power consuming devices 315, micro-grid monitoring and visualization devices 320, EM system 120, UAS system 130, gateways 420, and micro-grid broker 425. Power supply 310, energy consuming devices 315, and micro-grid and monitoring and visualization devices 320 are the same or similar to those described above with respect to FIG. 3. In the present implementation, the use of MQTT messaging for wireless communication improves the reliably with respect to a wireless network using SIP.

As shown in FIG. 4, each element in environment 400 may act as a publisher of the information or subscriber of information. Gateways 420 perform protocol transformation by stripping header elements from MQTT messages or adding header elements for MQTTs. Micro-grid broker 425 exchanges messages between clients (i.e., micro-grid manager 104, power supply devices 310, power consuming devices 315, EM system 120, UAS system 130, and micro-grid monitoring and visualization devices 320) to send MQTTs message and for subscribers to receive. Thus, micro-grid broker 425 can store the received and routed messages based on one of a flag of transported messages that specifies the data retention requirement of the message, even once the message is delivered to desired clients.

Flow Diagrams

FIGS. 5-11 show exemplary flows for performing aspects of the present invention. For example, the steps of FIGS. 5-11 may be implemented in the environment of FIG. 1 and/or in the block diagrams of FIGS. 2-4. The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Furthermore, the invention can take the form of a computer program product accessible from the computer-readable storage medium providing program code for use by or in connection with a computer or any instruction execution system or the computer readable signal medium.

Figure 5:
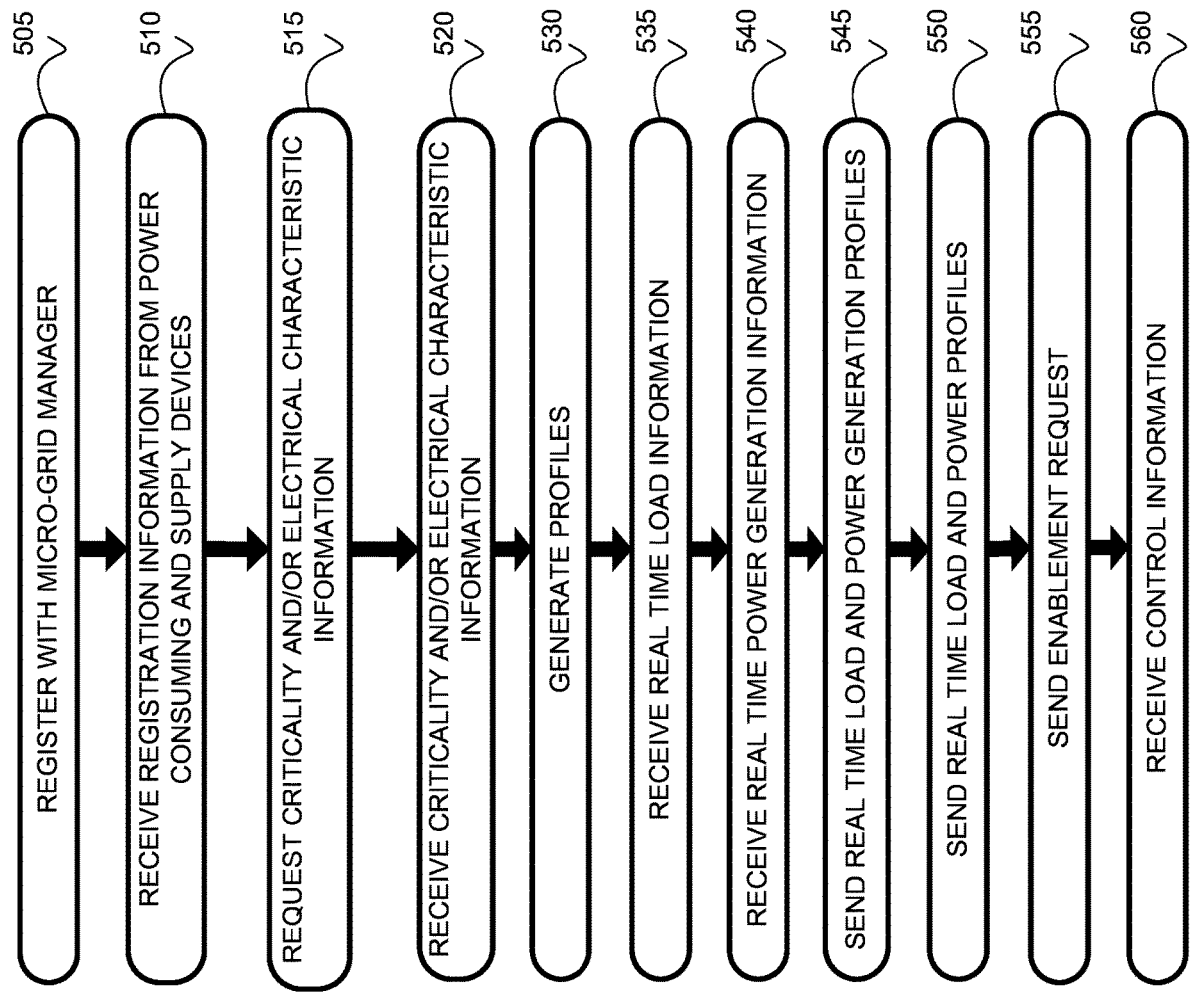
FIGS. 5-11 show flow diagrams of exemplary processes for configuring a micro-grid in accordance with aspects of the present invention.

FIG. 5 depicts an exemplary flow of processes in accordance with aspects of the invention. Specifically, FIG. 5 shows processes for receiving power consumption information (e.g., electric load) and power supply information from power consuming devices (e.g., air-conditioning devices, washer/dryers, etc.) and power supply devices (e.g., generators, turbines, etc.), generating profiles based on the received information, and transmitting the profiles to a micro-grid manager in accordance with aspects of the invention. The steps of FIG. 5 are described with regards to an EM system receiving and transmitting the information. In embodiments, receiving and transmitting information may be executed by using a SIP communication system or a MQTT communication system as described with aspects of the invention.

At step 505, an EM system registers with a micro-grid manager. The EM system may send identification information, for the EM system, to the micro-grid manager, such as an identifier (e.g., EM system #1, EM system—Hospital, etc.), a serial number, or any other type of identifier. The micro-grid manager may store this registration information so that the micro-grid can determine that future communications are being sent by a particular EM system. The EM system may also store information that the micro-grid manager is now subscribed to receive information from the EM system.

At step 510, the EM system receives registration information from one or more power consuming devices and/or from one or more power supply devices. The registration information for both the power consuming device and the power supply devices may include an identifier (e.g., a serial number, a name, etc.), location (e.g., a hospital, a house, an industrial warehouse, a police station, a movie theatre, etc.), types of devices (e.g., a generator, a micro-turbine, a wind-powered turbine, etc.), and/or any other information. The EM system may store the registration information within a database. In embodiments, the information may include the age of the devices (e.g., one year old, five years old, etc.) and/or any maintenance information (e.g., overhauling a diesel/natural gas engine on a generator, replacement of a compressor being used in an air handling unit, etc.). The EM system may send the registration information for the power consuming devices and the power supply devices to the micro-grid manager, which may also store this registration information.

At step 515, the EM system requests criticality levels and electrical characteristics from a UAS system. The UAS system determines the criticality levels as noted above. The UAS system can store electrical characteristics of different power consuming devices, such as the power requirements of the power consuming device (e.g., kilowatt demand, voltage, current, single phase, 3-phase), time of use (e.g., load is used 24 hours a day, once a week, during a particular time period (such as from 5:00 p.m. to 11 p.m. on weekdays), etc.), high energy consuming power consuming device (based on power requirements, e.g., any load over a threshold, such as 500 kW), etc.), and/or any other type of information. The UAS system can also store electrical characteristics of different power supply devices, such as power supply specifications of the power supply device (e.g., stand-by power output, continuous operating power output), whether the power supply device is used for backup, hours of operation (e.g., on-peak hours of operation, off-peak hours of operation, etc.), and/or any other specifications.

At step 520, the EM system receives criticality levels and electrical characteristic information from the UAS system. At step 530, the EM system generates and/or updates profiles with load profiles and power supply profiles. The EM system may automatically generate a profile based on the received electric information, criticality information, and the power supply information including using historical information, forecast information, location information, etc. The profile may be configured to generate control information, such as controlling when various power consuming devices and/or power supply devices are to operate, controlling the outputs of various power consuming devices (e.g., supply temperature from a chiller), and/or controlling the outputs of various power supply devices (e.g., power output for a generator). The load profile and the power supply profile may be generated and stored as separate profiles in the EM system.

Alternatively, a load profile and/or power supply profile may be updated when there is a change to the power consuming device and/or power supply information. For example, a load profile may be updated when a hospital adds a new chiller for air-conditioning in a new wing of a hospital. Additionally, or alternatively, an independent power producer (IPP) may have added a new gas driven turbine and as such, the information is sent to the EM system which can generate and/or store a profile for the new gas turbine. The EM system may generate and store one or more profiles for one or more locations, devices, etc. Also, different profiles may be used for different time periods (e.g., during the week versus the weekend, during the winter months versus the summer months, during emergency events, etc.).

At step 535, the EM system sends the updated load profiles and the updated power supply profiles to the microgrid manager. The micro-grid manager may be subscribed to receive information from the EM system based on a registration of a device. The micro-grid manager may use the profiles to update the electrical state of the micro-grid.

At step 540 the EM system receives real time load information associated with one or more power consuming devices that are registered with the EM system. The real time load information includes the power usage requirements by one or more power consuming devices at the current time or within a time period of the current time. For example, if the current time is 10:00 a.m., then the EM system receives the load information at 10:00 a.m. or within a time period from the current time (e.g., 10:00:01 a.m., 10:00:05 a.m., etc.). The EM system uses the real time load information to update one or more load profiles stored by the EM system. The real time information may be sent automatically by the power consuming device, or the EM system may request the information from the power consuming devices (e.g., sending messages, pings, etc.).

At step 545, the EM system receives real time power supply information associated with one or more power supply devices that are registered with the EM system. The real time power supply information includes the power generation by one or more power supply devices. The EM system uses the real time power supply information to update one or more power supply profiles stored by the EM system. The real time information may be sent automatically by the power supply device or the EM system may request the information from the power supply devices (e.g., sending messages, pings, etc.).

At step 550, the EM system sends the real time load profile and the real time power supply profile to the micro-grid manager. In embodiments, the real time load profile and the real time power supply profile can be sent at the same time or approximately the same time (e.g., within one second, five seconds, 20 seconds, etc.) to the micro-grid manager.

At step 555, the EM system initiates a request. The request may be an enablement request which may be a request by a user of the EM system to enable one or more of the power consuming devices to receive power via the micro-grid manager. Alternatively, the request may be a request to add a power supply device to the micro-grid. The micro-grid manager may receive the request and use the request to determine control information used by the EM system to control power consuming devices and/or power supply devices.

At step 560, the EM system receives control information from the micro-grid manager. The control information may instruct the EM system to use a particular load profile and/or power supply profile that starts or stops a particular power consuming device, adjust the outputs of electrical appliance, e.g., increase the temperature of an air-conditioner unit, increase pump outputs, increase or decrease a variable speed drive motor, ramp up or ramp down a particular power supply device, and/or any other type of information that may used to control the particular power supply device.

Figure 6:
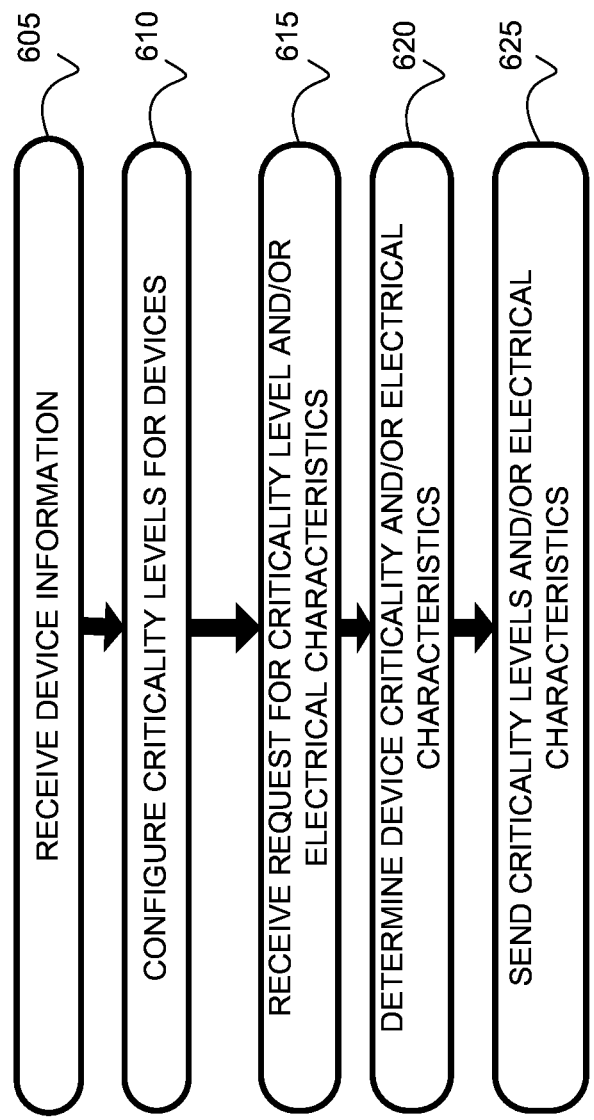

FIG. 6 shows processes of determining criticality levels for power consuming devices in accordance with aspects of the invention. The information may be transmitted between a UAS system, an EM system, and other devices by using a SIP communication system or a MQTT communication system as described with aspects of the invention.

At step 605, a UAS system receives information about one or more different types of power consuming and/or supply devices. The information may include identifier information (e.g., a name, a number, etc.), year of manufacture, type of device (e.g., a generator, a dialysis machine, a soda fountain, etc.), electrical characteristic information, mechanical information, and/or any other type of information that describes the operational characteristics of the device. The UAS system can receive the information from a computing device associated with one or more different sources, such as from the manufacturer of the device, from a utility company associated with the grid, the company operating the micro-grid manager, and/or from any other entity that has information about the power consuming and/or supply devices.

At step 610, the UAS system determines the criticality level of each of the one or more different power consuming and/or supply devices. For example, the UAS system can determine the criticality level based on inputs from a user. Additionally, or alternatively, the UAS system can include an algorithm or any other type of method that determines the criticality level. The UAS system, by way of example, can use a formula which analyzes the type of device, the location of the device, and other information to determine the criticality level.

The UAS system may assign values to different factors and then use an analytical system to provide a value that indicates the device's criticality level. The UAS system could also provide different devices within a location with different criticality levels. For example, the UAS system may assign a heart monitor a greater criticality level than a washing machine, with both located at a hospital. The UAS system can also change the criticality level based on information about events, such as hurricanes, earthquakes, terrorist attacks, and/or any other type of event that could cause an emergency/catastrophic situation. In embodiments, UAS system can change non-critical levels for some devices to critical levels, such as when a building (e.g., a school) is assigned as a shelter during an emergency event.

At step 615, the UAS system receives device information from an EM system or from a third party source (e.g., a device manufacturer). The EM system, or the third party source, can send information to the UAS system, such as the location of the device (e.g., a particular geographic location, an address, a type of location—hospital, school, etc.), the type of device (e.g., chiller, washing machine, refrigerator, etc.), and/or any other type of information.

At step 620, the UAS system determines a criticality level and/or electrical characteristics for the device. The UAS system can analyze the information sent by the EM system and assign a criticality level, based on the UAS system's method of assigning criticality levels, and electrical characteristics as noted above. At step 625, the UAS system sends the criticality level and/or the electrical characteristic information to the EM system. The EM system can use the criticality level information and/or the electrical characteristic information to generate a load and/or power supply profile, as noted above, which are then published (e.g., sent) to the micro-grid manager.

Figure 7:
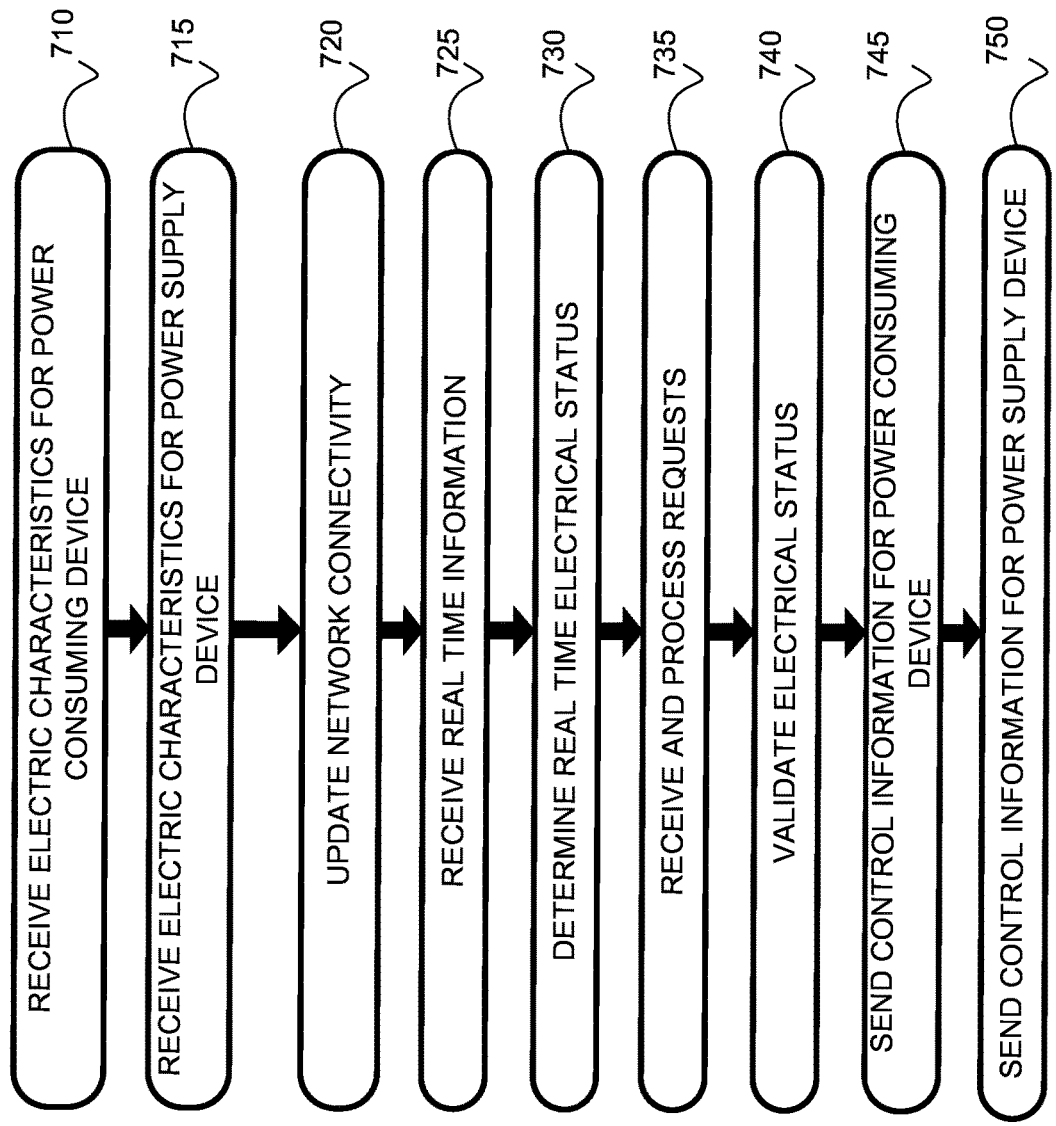

FIG. 7 shows processes for receiving power consumption information and power supply information in accordance with aspects of the present invention. In embodiments, the information can be used to determine the amount of available power as well as determine which power consuming devices should receive power based on the amount of available power. In embodiments, FIG. 7 can be representative of processes for sending load and/or power supply profiles for one or more devices. For example, registration information can be at the appliance level or at the load profile level. The steps of FIG. 7 are described with respect to a micro-grid manager. In embodiments, the micro-grid manager can receive and transmit information by using a SIP communication system or a MQTT communication system as described in accordance with aspects of the invention.

At step 710, the micro-grid manager receives electric characteristics of a power consuming device. The electric characteristics may include maximum power demand, voltage, current, impedance values, and/or any other type of power demand information. In embodiments, the micro-grid manager receives the electric characteristics within one or more load profiles that are generated by the EM system (which is registered with the micro-grid manager as described in FIG. 5) which can control different power consuming devices.

The power consuming device may have one or more sensors and/or other mechanisms located on the power consuming device that receives and sends the electric characteristics to the micro-grid manager or the EM system. In embodiments, the power consuming device may be registered with the micro-grid manager or may register at the same time that the micro-grid manager receives the electric characteristics of the power consuming device. The registration information may include identification information regarding the power consuming device (e.g., type of device, location of device, etc.) similar to the registration information as described in FIG. 5.

At step 715, the micro-grid manager receives electric characteristics of a power supply device. The electric characteristics may include whether the power supply device is on or off, the maximum power for standby and continuous power generation, voltage, current, impedance values, and/or any other type of electric/mechanical information. In embodiments, the micro-grid manager receives the electric characteristics within a power supply profile of one or more power supply devices that are used by the EM system to operate the power supply devices. In embodiments, the micro-grid manager receives the electric characteristics directly from the EM system. The power supply device may have one or more sensors and/or other mechanisms that receive and send the electric characteristics of the power supply device for the micro-grid manager. In embodiments, the power supply device may be registered with the micro-grid manager or may register at the same time that the micro-grid manager receives the electric characteristics of the power supply. The registration information may include identification information (e.g., type of power supply device, location of power supply device, etc.) regarding the power supply device similar to the registration information as described herein.

At step 720, the micro-grid manager updates the network connectivity. In embodiments, the network connectivity is a relationship between the available loads and the power supply devices being used within the micro-grid. The micro-grid manager may update a model that includes the electric characteristics of the power consuming device and the power supply device. The information may include voltage information, infrastructure of the transmission system, location of each power consuming device and/or power supply within the transmission system, the type of transmission system being used by the micro-grid, and/or any other type of information.

At step 725, the micro-grid manager receives real time information about the power consuming devices and/or the power supply devices. The micro-grid manager may receive the real time information automatically from the devices, or directly from the EM system. Alternatively, the micro-gird manager may request real time information (e.g., sending a ping or a message after a particular time period, such as every second, two seconds, etc.) from the EM system. The real time information, for example, includes the power usage by each power consuming device and the power supply from each power supply device.

At step 730, the micro-grid manager calculates a real time electrical state of the micro-grid using the collected information. For example, using the real time electric characteristics of the power consuming device and the power supply device, the micro-grid manager may implement linear calculations or non-linear calculations (e.g., Newton-Raphson method) to calculate power flow and power quality to determine the real time electrical state of the micro-grid. In embodiments, the micro-grid manager may, additionally or alternatively, use forecast information (e.g., weather) and/or historical information to determine the real time electrical status of the micro-grid.

At step 735, the micro-grid manager receives and/or processes a request to the power consuming device or power supply device. In embodiments, the request may be (i) an enablement request for a power consuming device from an EM system, (ii) a request from the EM system to add a power supply device to the micro-grid, (iii) a request from the EM system to stop sending power from a power supply device, and/or (iv) a request from the EM system to stop using a particular load. Based on the request, in embodiments, the micro-grid manager selects a load profile and/or a power supply profile that allows for the request for power to be granted. This may include selecting a load profile that uses a particular amount of power and/or a power supply profile that provides a particular amount of power to a particular number of power consuming devices.

In embodiments, the micro-grid manager may also receive (i) a request to provide power to a power consuming device, (ii) a request to add a power supply device, and/or (iii) a request to stop using a power supply device. Based on the request, the micro-grid manager can provide power for the power consuming device, ramp up particular power supply devices, and/or provide a notice that power is not available for the power consuming device.

At step 740, the micro-grid manager validates that the electrical state can process the request. For example, the micro-grid manager may simulate the effects of adding and/or deleting and/or modifying different power consuming devices and/or power supply devices to the power flow of the micro-grid prior to sending any commands to initiate the request. If the simulation does not validate the request, then the micro-grid manager may make changes (e.g. capacitor switching, phase-shift adjustment, load transfer, transformer tap adjustment, etc.) so that the power flow ensures that the request can be processed.

At step 745, the micro-grid manager sends control information for the power consuming device based on the validation by the micro-grid manager to the EM system. For example, the control information may instruct the power consuming device to operate in a particular manner. The control information may include power input, instructions on outputs from the load (e.g., air-conditioning device can only provide conditioned air at 76 degrees Fahrenheit), and/or any other type of control information.

At step 750, the micro-grid manager sends control information for the power supply device. In embodiments, the micro-grid manager may send the control information directly to the EM system. The control information may instruct the EM system to use a particular power supply profile that ramps up power, ramps down power, turns on a power supply device, and/or turns off a power supply device.

Figure 8:
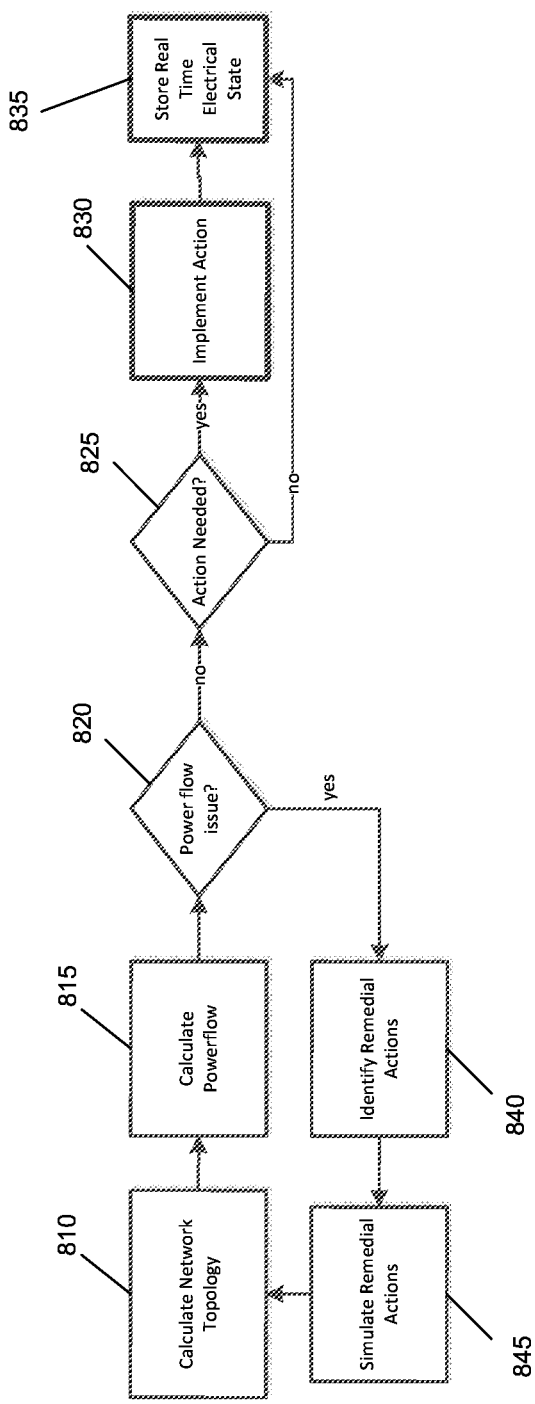

FIG. 8 depicts an example flow of processes for determining the real time electrical state of a micro-grid. The steps of FIG. 8 are described with respect to a micro-grid manager.

At step 810, the network topology is determined by analyzing which loads are connected with which power supply devices. The micro-grid manager can use the network topology to analyze the types of transmission systems used to connect different power consuming devices with different power supply devices.

At step 815, the power flow is calculated by using the network topology, magnitude of power, phase angles of voltage for different buses (e.g., generation bus) within the micro-grid, real and reactive power flowing through a particular type of transmission system within the micro-grid, and/or other information. In embodiments, the calculated power flow allows for the micro-grid manager to determine the optimal operation of the micro-grid based on the real time information about the power consuming devices and/or power supply devices. The calculated power flow also allows for the micro-grid manager to plan for future expansion of power systems. In embodiments, the power flow calculation may be performed by using logic associated with the Newton-Raphson method, the Gauss-Seidel method, the Fast-decoupled load flow method, other non-linear analysis method, and/or any other linear analysis methods known to those of skill in the art.

At step 820, the micro-grid manager determines if there are any issues with the power flow. If there no issues with the power flow, at step 825, the micro-grid manager determines if any remedial actions are needed to ensure reliability and sustainability in the micro-grid. If other actions are needed, at step 830, the micro-grid manager prepares enrollment requests and signal controls to ensure that the micro-grid is reliable and sustainable. The changes made to the real time micro-grid electrical state are stored by the micro-grid manager, at step 835. If other actions are not needed then the micro-grid manager stores the micro-grid electrical state without any changes at step 835.

If there is an issue with the power flow at step 820, then the micro grid manager, at step 840, automatically identifies any remedial actions to solve the power flow issue. These actions may be e.g., capacitor switching, phase-shift adjustment, load transfer, transformer tap adjustment, etc. At step 845, the micro-grid manager simulates the remedial actions, and then sends the remedial actions (e.g. capacitor switching, phase-shift adjustment, load transfer, transformer tap adjustment, etc.) to the micro-grid manager to calculate the network topology. The recalculated network topology is then used to determine a power flow that allows for the micro-grid to provide the power for the power consuming devices in the micro-grid.

Figure 9:
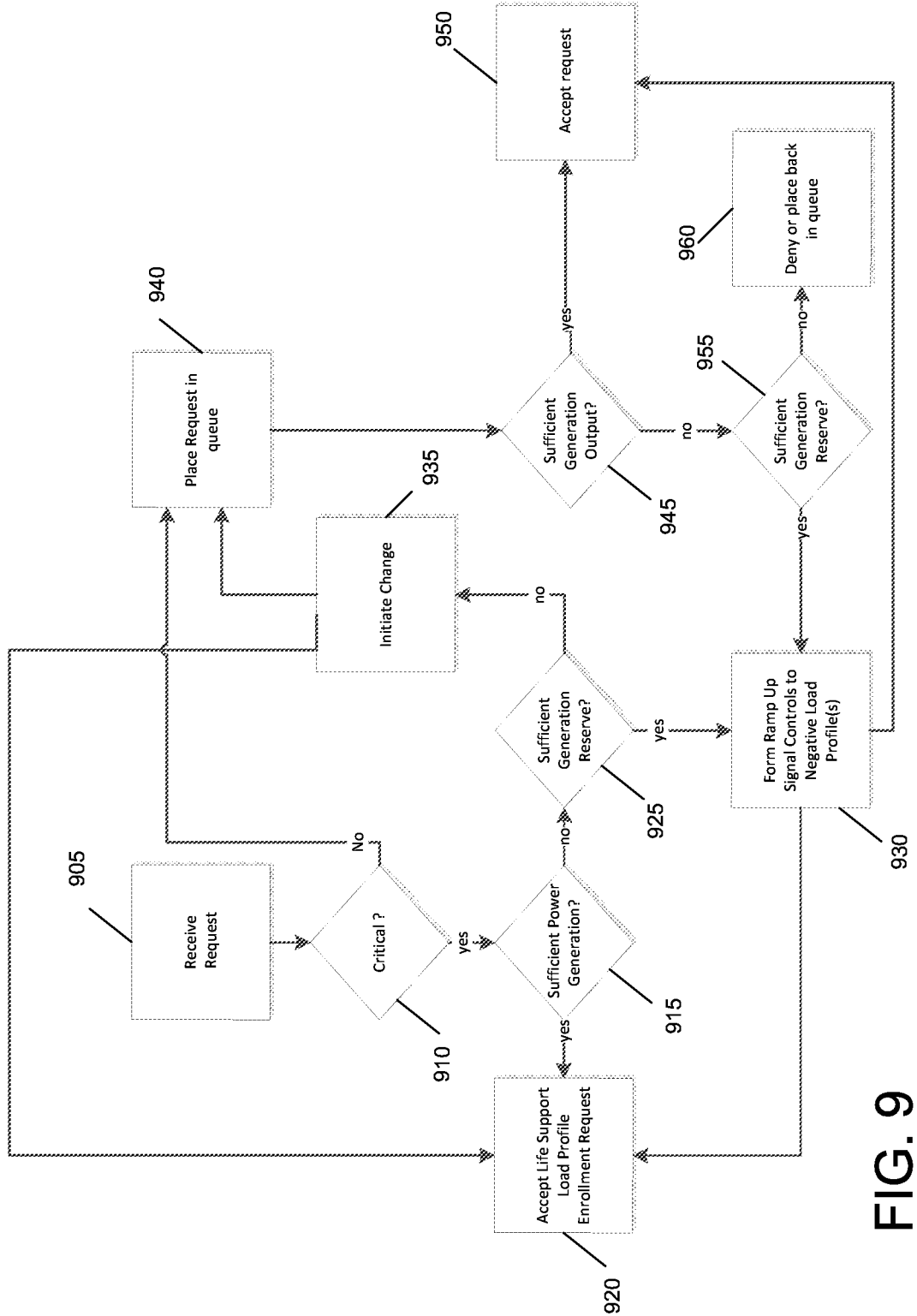

FIG. 9 depicts an exemplary flow of processes for receiving and implementing requests to provide power to a power consuming device within a micro-grid in accordance with aspects of the present invention. In embodiments, although FIG. 9 refers to load profiles and power supply profiles, the profile can be respectively, a single power consuming device and a single power consuming device. The steps of FIG. 9 are described with respect to a micro-grid manager. At step 905, the micro-grid manager receives a request (via SIP or MQTT messaging). In embodiments, the request may be an enablement request from an EM system to enable one or more power consuming device within a load profile.

As step 910, the micro-grid manager determines whether the request is associated with a critical power consuming device. For example, the micro-grid manager can determine whether the enablement request received from the EM system is associated with a critical load profile. In embodiments, the micro-grid manager can also determine whether the start request is from a critical power consuming device itself.

If the request is associated with a critical power consuming device, then the micro-grid manager determines, at step 915, whether there is enough power being generated by power supply device(s) to provide power for the critical power consuming device. If there is enough power at step 920, the micro-grid manager accepts the request. If there is not enough power being generated at step 925, the micro-grid manager determines whether there is enough reserve power to provide the power for the critical power consuming device. If there is enough reserve power, then, at step 930, the micro-grid manager ramps up the power supply from reserve power supply devices to provide power to the critical power consuming devices. The process then returns to the micro-grid manager at step 920. If there is not enough reserve power, at step 935, the micro-grid manager makes changes to other power consuming devices that have a lower priority than the power consuming device requesting the power. For example, the micro-grid manager can divert power from a non-critical device to a critical device. After validating that the request relates to a critical load profile, or a device, if there is no sufficient power reserve (at step 925), the micro-grid manager will both initiate a change, at step 935, and accept the request from the critical device at step 920. Even thought there is a lack of generation output and reserve, initiating the change will divert power from the non-critical power consuming device to the critical power consuming device. This can allow the micro-grid manager to accept the request from the critical power consuming device without impacting the reliability of the network.

At step 940, the micro-grid manager places the request for critical power consuming device or the requirement for a non-critical power consuming device (that has been stopped) within a queue of requests. At step 945, the micro-grid manager determines whether there is power being generated that can provide power for the power consuming device. If so, at step 950, the critical power consuming device or the non-critical power consuming device is provided with power.

If there is not enough generated power at step 955, the micro-grid manager determines if there is enough reserve power. If so, at step 950, the micro-grid manager ramps up the reserve power supply devices so that enough power is generated to meet the demands of the critical/non-critical power consuming device. If there is not enough reserve power at step 960, the micro-grid manager can place the power request for the critical and/or non-critical power consuming device back into the queue or, alternatively, the micro-grid manager can send a message denying the request. If the micro-grid manager is placing a request for power from a non-critical power consuming device into a queue of power requests, the micro-grid manager may simultaneously accept a critical power consuming device request for power and send instructions so that the critical power consuming device receives the power.

If, at step 910, the request is associated with a non-critical power consuming, at step 940, the micro-manager places the request in a queue of requests for power. The request for power is then determined based on sufficient generation output at step 945 and/or sufficient generation reserve at step 955.

Figure 10:
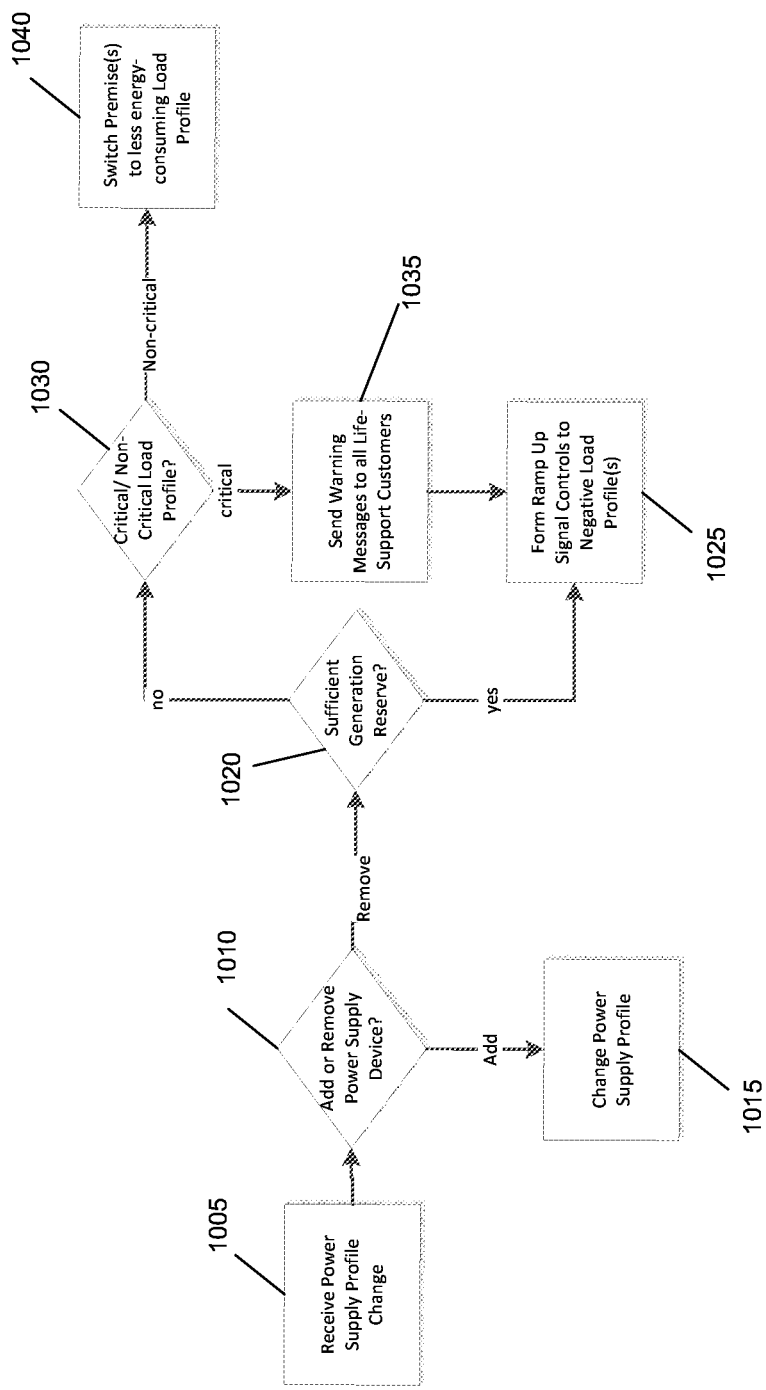

FIG. 10 depicts an exemplary flow of processes for receiving and implementing changes to the power supply within a micro-grid in accordance with aspects of the present invention. In embodiments, although FIG. 10 refers to load profiles and power supply profiles, the profile can be respectively, a single power consuming device and a single power consuming device. At step 1005, the micro-grid manager receives and processes a request to change power being supplied by a power supply device. In embodiments, the request may be received as a profile from the EM system or directly from the power supply device. At step 1010, a determination is made as to whether the request is to stop providing power from a power supply device or to add a power supply device. If the request is to add a power supply device, the micro-grid manager updates the network connectivity model of step 1015 to include the additional power. The additional power may occur by adding a power supply device or a no longer operational power consuming device.

If the request is to stop providing power from a power supply device, at step 1020, the micro-grid manager determines whether there is sufficient generation reserve. If there is sufficient generation reserve at step 1025, the micro-grid manager generates control signals to ramp up power supply from other power supply devices. This also allows the micro-grid manager to continue to provide power to power consuming devices that were receiving power from a previously non-operating power supply device. In embodiments, the ramping up of power may be sent as an instruction to an EM system to ramp up power supply devices managed by the EM system. In embodiments, the micro-grid may directly ramp up power for a power supply device.

If there is not sufficient generation reserve at step 1030, the micro-manager determines whether a critical or non-critical power consuming device is being powered. If a non-critical power consuming device is being powered at step 1040, in embodiments, the micro-manager switches to a load profile that uses less power at step 1040. The load profile can be implemented by the EM system to control different power consuming devices. In embodiments, the micro-manager makes the decision to stop sending power to the non-critical power consuming device and generates control information that is used to control different power consuming devices.

If a critical power consuming device is being powered at step 1035, a warning message is generated for users who are using the critical power consuming device. The warning message may be sent via the EM system and may indicate that there is a potential for loss of power to the critical power consuming device. The warning signal may also trigger a signal to ramp up power to other power supply devices that are available, at step 1025. In embodiments, the micro-manager can place a stop request in a queue to non-critical devices in order to ensure sustainability to the critical devices.

Figure 11:
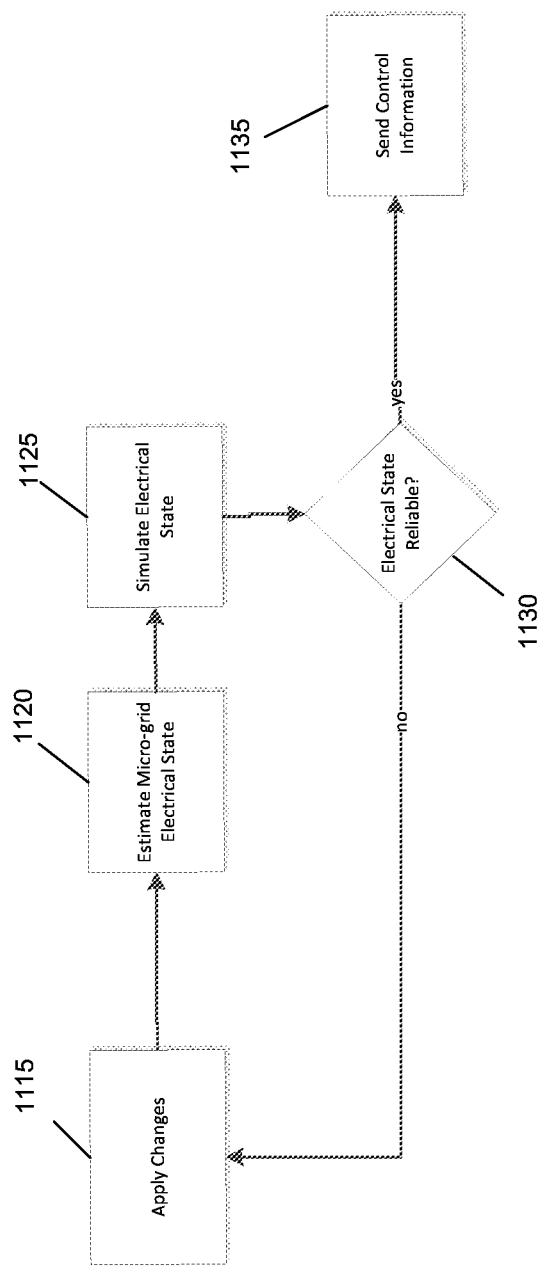

FIG. 11 depicts an exemplary flow of processes of validating changes in operation of devices within a micro-grid in accordance with aspects of the present invention. This may result in the micro-grid maintaining its reliability and sustainability. At step 1115, the micro-grid manager applies changes to the real time electrical state based on requests to enable a power consuming device, to add a power supply device, and/or to stop providing power from a power supply device. This may include changing the load profiles, the power supply profiles, modifying the operation of a power consuming device (e.g., if the power consuming device is an electric heater, then only provide enough power to provide heat at a particular temperature) and/or a power supply device.

At step 1120, the micro-grid manager estimates and updates the electrical state of the micro-grid by using any changes based on the requests to enable a power consuming device, to add a power supply device, and/or to stop providing power from a power supply device. The micro-grid manager may use linear or non-linear calculations to make the estimations for the updated electrical state.

At step 1125, the micro-grid manager simulates the activity within the micro-grid based on the updated electrical state of the micro-grid. The simulation determines whether the power flow and quality analysis provides power to the updated micro-grid as well as maintaining the reliability and sustainability of the micro-grid.

If the simulation results determine that the electrical state of the micro-grid can provide the power for the loads at step 1130, in embodiments, the micro-grid manager can send control information for the power consuming device and the power supply device to the EM system at step 1135. The EM system uses the instructions in the control information to select which profiles, stored by the EM system, are to be used to control the power consuming device and/or the power supply device. In embodiments, the micro-grid manager can send the control information directly to the device. The control information can instruct the devices on how to operate according to the control information.

If the simulation results determine that the micro-grid cannot provide the power without ensuring the reliability and/or sustainability of the micro-grid, at step 1120, the micro-grid manager adds additional constraints to the estimated electric state of the micro-grid to apply changes by returning to step 1115. The additional constraints may include capacitor switching, phase-shift adjustment, load transfer, transformer tap adjustment, etc. Once the simulation ensures the reliability and sustainability of the micro-grid, the control information is then sent to the EM system.

Examples

By way of a non-limiting example, a critical-care user has newly installed life-support equipment (e.g., a dialysis machine) that needs to be powered on at all times. The life-support equipment sends its power requirements to an EM system. The EM system may generate a life-support (LS) load profile that is assigned a critical priority and a life-support equipment energy profile. The EM system receives the critical priority and electrical characteristics of the life support system from a UAS system. The EM system sends the load profile to a micro-grid manager which updates the micro-grid electrical connectivity model with the minimal load profile that the micro-grid must power at all times to the life-support equipment. The micro-grid manager verifies whether there is sufficient generation output and reserve available within the micro-grid to accommodate the updated minimal load profile. With sufficient generation output and reserve available, the micro-grid manager provides power to the life-support equipment. When there is not sufficient generation, the micro-grid manager stops providing power to non-critical power consuming devices and diverts that power to fulfill power requirements defined within the load profile for the life-support equipment.

By way of another non-limiting example, a user requests power for non-critical devices (e.g., a television, a DVD player, etc.). The EM system may generate a load profile for the non-critical devices and sends the load profile to the micro-grid manager. The EM system receives the critical priority and electrical characteristics of the non-critical device from a UAS system in order to generate the load profile. The micro-grid manager receives the load profile and processes the request by analyzing the power supply devices that are monitored and controlled by the micro-grid manager. The micro-grid manager may determine that there is generation output and reserve that is above a threshold that allows for the micro-grid manager to provide power based on the information in the load profile. Alternatively, the micro-grid manager may determine that the generation output and reserve is insufficient to ensure power for the non-critical devices and also to maintain the reliability of the micro-grid. In the latter scenarios, the micro-grid manager denies the request and sends a message to the user of the non-critical devices that power is currently unavailable.

By way of another non-limiting example, a user installs a new power supply device (e.g., distributed generation systems that use a micro-turbine, a generator, etc.) at their location. The new power supply device can provide additional power to the micro-grid. Using the EM system, the user creates a power supply profile that includes the electrical characteristics (e.g., power output) of the new generation equipment. The EM system receives the electrical characteristics of the power supply device from a UAS system. The power supply profile may also include information about other power supply devices at the user's location. The EM system may publish and send the power supply profile to the micro-grid manager. The micro-grid manager may use the power supply profile to update the electrical network connectivity model with the information regarding the new power supply device. The micro-grid manager uses the power supply profile to monitor and control the new power supply device. Further, the micro-grid manager may use the new power supply profile to provide power requirements based on load profiles stored by the micro-grid manager while still ensuring the overall power quality, reliability and sustainability of the micro-grid.

In embodiments, a service provider, such as a Solution Integrator, could offer to perform the processes described herein. In this case, the service provider can create, maintain, deploy, support, etc., the computer infrastructure that performs the process steps of the invention for one or more customers. These users may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising the steps of:
    receiving information of a power consuming device from an energy management (EM) system, including criticality information obtained from a universal appliance service (UAS) system;
    receiving power supply information of one or more power supply devices associated with an electric grid;
    receiving a power request from the power consuming device;
    determining a power quality level of the one or more power supply devices based on a network topology of the one or more power supply devices; and
    determining, by a computing device, that the power consuming device receives power from the one or more power supply devices, based on the criticality information and the power supply information,
    wherein the criticality information of the power consuming device includes identification that the power consuming device is a critical power consuming device or a non-critical power consuming device.

2. The method of claim 1, wherein the UAS system determines the criticality of the power consuming device further based on a particular time period, a power consuming device's location in comparison to remaining power consuming devices, and device type.

3. The method of claim 1, wherein the UAS system receives the information of the power consuming device directly from a third party source, and changes the criticality of the power consuming device from the non-critical power consuming device to the critical power consuming device based on a catastrophic event.

4. The method of claim 3, wherein the UAS system receives the information of the power consuming device directly from a device manufacture to determine the criticality information and provides the information of the power consuming device to the EM system, which generates a load profile which includes power demand requirements of the power consuming device at different times of a day.

5. The method of claim 3, wherein the UAS system receives a power consuming device's location and the identification of device type from the EM system and, in combination with the information of the power consuming device, determines the criticality of the power consuming device.

6. The method of claim 1, wherein the steps of receiving information of the power consuming device and receiving power supply information are performed using one of Simple Internet Protocol (SIP) communication messages and Message Queue Telemetry Transport (MQTT) messages.

7. The method of claim 1, wherein:
    the power supply information is received as a power supply profile and the information of the power consuming device is received as a load profile from the EM system, wherein the load profile includes the criticality information of the power consuming device received from the UAS system;
    the power supply profile is associated with one or more of the power supply devices; and
    the load profile is associated with the power consuming device and additional power consuming devices.

8. The method of claim 7, wherein the power supply profile includes electrical characteristics for each of the power supply devices as determined by the UAS system.

9. The method of claim 1, wherein the determining the power consuming device receives the power includes:
    determining an amount of power being requested by the power consuming device;
    determining an amount of generated power and an amount of reserve power available from the one or more power supply devices; and
    determining that at least one of the amount of generated power and the amount of reserve power is sufficient to provide the amount of power being requested, to the power consuming device while maintaining integrity of the electric grid.

10. The method of claim 9, further comprising sending a message to the computing device that the power is available for both the critical power consuming device and the non-critical power consuming device, and when there is enough power for the non-critical power consuming device, providing the power to the non-critical power consuming device.

11. The method of claim 10, further comprising providing a load profile to the electric grid, the load profile information comprising an amount of power consumption requirements at different times for the power consuming device.

12. The method of claim 1, further comprising disabling the non-critical power consuming device in response to the power quality level reaching a first predetermined threshold.

13. The method of claim 1, further comprising determining a power flow level of the one or more power supply devices based on the network topology of the one or more power supply devices.

14. The method of claim 13, further comprising disabling the non-critical power consuming device in response to the power flow level reaching a second predetermined threshold.

* * * * *